United States Patent
Hachiya et al.

(10) Patent No.: US 10,217,027 B2
(45) Date of Patent: Feb. 26, 2019

(54) RECOGNITION TRAINING APPARATUS, RECOGNITION TRAINING METHOD, AND STORAGE MEDIUM

(71) Applicant: CANON KABUSHIKI KAISHA, Tokyo (JP)

(72) Inventors: Hirotaka Hachiya, Yokohama (JP); Masakazu Matsugu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 65 days.

(21) Appl. No.: 15/406,391

(22) Filed: Jan. 13, 2017

(65) Prior Publication Data

US 2017/0206437 A1    Jul. 20, 2017

(30) Foreign Application Priority Data

Jan. 14, 2016 (JP) ................................ 2016-005598

(51) Int. Cl.
*G06K 9/00* (2006.01)
*G06K 9/62* (2006.01)

(52) U.S. Cl.
CPC ....... *G06K 9/6257* (2013.01); *G06K 9/00684* (2013.01); *G06K 9/6219* (2013.01); *G06K 9/6267* (2013.01)

(58) Field of Classification Search
CPC ............................ G06K 9/6257; G06K 9/6267
USPC ........................................................ 382/157
See application file for complete search history.

(56) References Cited

U.S. PATENT DOCUMENTS

2016/0171707 A1* 6/2016 Schwartz ........... G06K 9/00201
                                                          382/180
2017/0061250 A1* 3/2017 Gao ..................... G06K 9/6267

FOREIGN PATENT DOCUMENTS

JP     2006-031637 A    2/2006

OTHER PUBLICATIONS

Ross Girshick, et al.—Rich feature hierarchies for accurate object detection and semantic segmentation; IEEE Conference on Computer Vision and Pattern Recognition.
Kouji Kozaki et al.—A Present State of Ontology Development Tools; Journal of the Japanese Society for Artificial Intelligence (JSAI), vol. 20, No. 6, p. 707-714.
Shuiwang Ji, et al.—3D Convolutional Neural Networks for Human Action Recognition; Pattern Analysis and Machine Intelligence, vol. 35, No. 1, pp. 221-231.
Karen Simonyan, et al.—Two-stream convolutional networks for action recognition in videos; Advances in Neural Information Processing System 25.

* cited by examiner

*Primary Examiner* — Ping Y Hsieh
(74) *Attorney, Agent, or Firm* — Canon U.S.A., Inc. IP Division

(57) ABSTRACT

A recognition training apparatus according to the present invention includes a generation unit configured to generate relevance between a specific domain and a candidate of a recognition target based on ontology information expressing a concept structure of the specific domain, a selection unit configured to select the recognition target from the candidate of the recognition target based on the relevance generated by the generation unit, and a training unit configured to train a recognizer using training data regarding the recognition target selected by the selection unit.

13 Claims, 16 Drawing Sheets

| DOMAIN ID | DOMAIN NAME INFORMATION | ONTOLOGY INFORMATION |
|---|---|---|
| R100 | STORE | |
| R200 | STATION | |
| ⋮ | ⋮ | ⋮ |

FIG. 4

| DATA ID | RECOGNITION TARGET ID | RECOGNITION TARGET NAME | MOVING IMAGE DATUM | DATA TYPE |
|---------|----------------------|-------------------------|--------------------|-----------|
| D0001 | C1000 | PERSON AREA: (500, 10, 180, 50) | | TRAINING |
| D0002 | C1100 | SALES CLERK AREA: (200, 200, 180, 50) | | EVALUATION |
| ... | ... | ... | | |

| DOMAIN ID | RECOGNIZER PARAMETER | ASSEMBLY OF RECOGNITION TARGET ID | ASSEMBLY OF SEMANTIC RELEVANCE |
|---|---|---|---|
| R100 | | C1000, C2000, C3000, C1100, C1200, C1300, ... | 1, 1, 1, 0.8, 0.8, 0.8, |
| ... | ... | ... | ... |

M3

RECOGNITION TRAINING APPARATUS, RECOGNITION TRAINING METHOD, AND STORAGE MEDIUM

BACKGROUND

Field of the Disclosure

The present disclosure relates to a technique for training a recognizer which recognizes a recognition target from data.

Description of the Related Art

Recently, there are services which analyze activity patterns of people and crowds or detect and report specific events from moving image data pieces captured by monitoring cameras. In order to realize the services, recognition techniques of machine training are essential which can detect attributes of objects such as persons or vehicles, types of actions such as walking or running, and types of personal belongings such as bags or baskets from moving image data pieces captured by monitoring cameras. The services are used in various environments such as, nursing-care facilities, ordinary homes, public facilities such as stations and city areas, and stores like supermarkets and convenience stores. In addition, there are various needs of users to the services even in the same environment. Therefore, flexible and highly accurate recognition techniques of machine training are required which are applicable to various environments and use cases.

A technique for realizing flexible and highly accurate recognition by machine training is described in Ross Girshick, Jeff Donahu, Trevor Darrel, and Jitendra Malik, 2014, "Rich feature hierarchies for accurate object detection and semantic segmentation", IEEE Conference on Computer Vision and Pattern Recognition (CVPR) (hereinbelow, referred to as the non-patent literature 1). According to the technique described in the non-patent literature 1, first, general-purpose convolutional neural networks (hereinbelow, abbreviated as CNN) which is applicable to 1000 categories are trained in advance using large-scale supervised data pieces such as ImageNet. After the training, the number of categories are limited according to specific needs of a user, and training is performed in detail. The training in advance and the training in detail are respectively referred to as pre-training and fine-tuning. There is an advantage that pre-training of the CNN which requires an enormous number of parameters enables obtainment of a highly accurate recognizer corresponding to the specific needs in a relatively short time in the fine-tuning. In addition, since large-scale data pieces are used in the pre-training, it is expected that an issue that the enormous number of parameters overfit a specific recognition target can be reduced.

Japanese Patent Application Laid-Open No. 2006-31637 describes a method for selecting any one of a plurality of pre-trained hierarchal neural networks and performing fine-tuning thereon using an input impression degree in prediction of an impression of a musical piece determined by a human sensitivity.

However, the method described in Japanese Patent Application Laid-Open No. 2006-31637 uses a structure of the common hierarchal neural network in the pre-training and the fine-tuning. Thus, it is difficult to flexibly change a recognition target according to a user needs.

On the other hand, according to the technique described in the non-patent literature 1, the number of outputs of the CNN can be changed, so that a recognition target can be flexibly changed in the pre-training and the fine-tuning. However, it is not necessarily the case that 1000 categories of ImageNet which are the recognition targets of the pre-training cover a need of a user who will use the CNN in the future. If the needs is not covered in the pre-training, an enormous number of parameters is required to be learned again in the fine-tuning, and benefits from the pre-training namely shortening of a training time and avoidance of overfit cannot be reaped. The pre-training can be performed on every recognition target by further increasing the number of categories to avoid the issue, however, a further enormous number of parameters is required to recognize innumerable recognition targets. However, a recognition target finally required by a user is small in scale in some cases, and there is an issue that an unnecessarily complicated CNN is trained in many cases. On the other hand, a great labor is required to manually select a recognition target used in the pre-training from innumerable recognition targets in consideration of a user needs.

SUMMARY

The present disclosure is directed to pre-training and fine-tuning of a recognizer considering a user needs.

According to an aspect of the present disclosure, a recognition training apparatus includes a generation unit configured to generate relevance between a specific domain and a candidate of a recognition target based on ontology information expressing a concept structure of the specific domain, a selection unit configured to select the recognition target from the candidate of the recognition target based on the relevance generated by the generation unit, and a training unit configured to train a recognizer using training data regarding the recognition target selected by the selection unit.

Further features of the present disclosure will become apparent from the following description of exemplary embodiments with reference to the attached drawings.

BRIEF DESCRIPTION OF THE DRAWINGS

FIG. 3 illustrates an example of information stored in an ontology storage unit according to one or more aspect of the present disclosure.

FIG. 4 illustrates an example of information stored in a moving image data storage unit according to one or more aspects of the present disclosure.

FIG. 5 illustrates an example of information stored in a recognizer storage unit according to one or more aspects of the present disclosure.

DESCRIPTION OF THE EMBODIMENTS

A first exemplary embodiment of the present disclosure is described in detail below with reference to the attached drawings. A recognition training system 1 according to the present exemplary embodiment is described using a case in which a provider of a recognizer performs pre-training on the recognizer according to a specific domain of a user. Specifically, the recognition training system 1 selects a recognition target from concept information pieces and performs pre-training on the recognizer based on ontology expressing a relationship between the specific domain and the concept information pieces which are candidates of the recognition target. Further, the recognition training system 1 visualizes a range of the recognition target of the recognizer subjected to the pre-training based on the ontology and provides the range to the provider. In this regard, an assembly of the concept information pieces on the ontology to the specific domain is a candidate of the recognition target of the pre-training. The concept information is a state of an object which can be conceptualized and expressed in words and is characterized by label information verbally expressing the state. The concept information includes, for example, an attribute of an object such as a "person" and a "vehicle", an action of the object, such as "walking" and "running", and a personal belonging such as a "bag" and a "basket".

The specific domain is an environment in which the present system is assumed to be used, for example, a nursing-care facility, an ordinary home, public facilities such as a station and a city, and a store. The user is an end user who directly uses the present system together with a monitoring camera for the purpose of, for example, analysis of an activity pattern of a customer or a sales clerk and an emergency report or a system integrator who adjusts a recognizer to provide the present system to a third party. The provider is a research and development staff who develops the present system and provides it to the user or the above-described system integrator.

Figure 1:
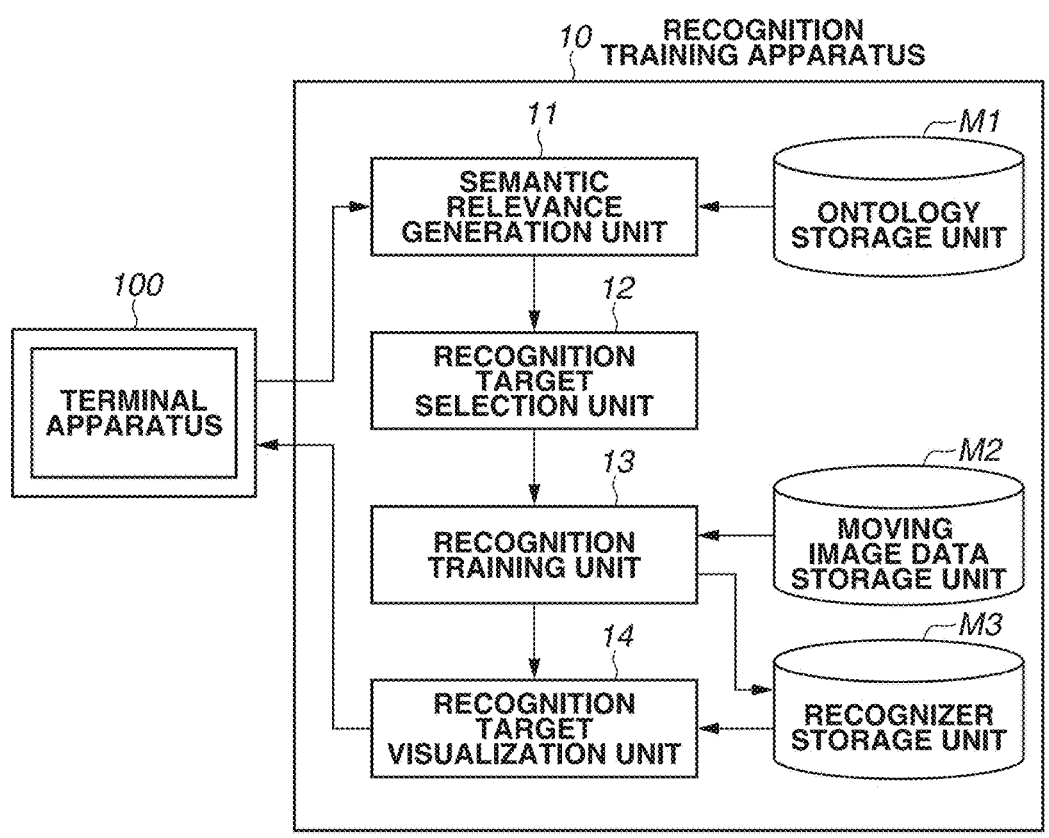
FIG. 1 is a schematic block diagram illustrating an example of a configuration of a recognition training system according to one or more aspects of the present disclosure.

FIG. 1 is a schematic block diagram illustrating an example of a configuration of the recognition training system using a recognition training apparatus according to the present exemplary embodiment. The recognition training system 1 includes a recognition training apparatus 10 and a terminal apparatus 100. These apparatuses may be connected therebetween via a network. To the network, for example, a fixed telephone line network, a mobile telephone network, and the Internet can be applied.

The recognition training apparatus 10 includes a display unit DS and an operation detection unit OP, which are not illustrated, as a hardware configuration. The display unit DS includes an image display panel, such as a liquid crystal panel and an organic electroluminescence (EL) panel, and displays information input from the recognition training apparatus 10. The display unit DS displays a list of domain name information pieces, such as a "nursing-care facility", an "ordinary home", a "station", a "city", and a "store", which are described below. The display unit DS also displays recognition target visualized information expressing a range of a recognition target which is described below in a description of a recognition target visualization unit 14 in the recognition training apparatus 10.

The operation detection unit OP which includes a touch sensor arranged on the image display panel of the display unit DS detects a user operation based on a movement of a user's finger and a touch pen and outputs operation information expressing the detected operation to the recognition training apparatus 10. The operation detection unit OP may include an input device, such as a controller, a keyboard, and a mouse and obtains the operation information expressing the user operation to an image displayed on the image display panel. The operation information includes, for example, selection of specific domain name information from among candidates of the domain name information and "execution of pre-training" expressing execution of pre-training of the recognizer. When the operation information is detected, the operation detection unit OP outputs a domain identification (ID) for identifying the selected domain name stored in the own apparatus and the detected operation information to the recognition training apparatus 10.

Next, a software configuration of the recognition training apparatus 10 is described in detail. The recognition training apparatus 10 is an apparatus for performing the pre-training on the recognizer according to the specific domain. The recognition training apparatus 10 includes an ontology storage unit M1, a moving image data storage unit M2, a recognizer storage unit M3, a semantic relevance generation unit 11, a recognition target selection unit 12, a recognition training unit 13, and the recognition target visualization unit 14.

The ontology storage unit M1 stores a domain ID for identifying a domain, domain name information for verbally expressing the domain, and ontology information expressing a concept structure of the domain in association with the domain ID. The domain ID is information for identifying a domain preliminarily set by the provider in which the present system is used. The domain name information is information expressing a name of the domain which verbally describes the domain. The domain name information is, for example, a "nursing-care facility", an "ordinary home", a "station", a "city", and a "store". The ontology information is information expressing the concept structure of the domain name information which is preliminarily defined by the provider for each domain. For example, the provider analyzes the domain and describes a tree structure of a concept assembly constituting the domain using an ontology editing software (Kouji Kozaki and Riichiro Mizoguchi, 2005, "A Present State of Ontology Development Tools", Journal of The Japanese Society for Artificial Intelligence (JSAI), vol. 20, No. 6, p 707-714). An is-a relationship expressing a super-sub relationship, a has-a relationship expressing a part-whole relationship, and the like are used between superordinate and subordinate concepts on the tree structure. As the is-a relationship and the has-a relationship between the concepts, a dictionary, such as WordNet in which tens of thousands of types of concepts are registered can be used. The concept information expressing each concept of the ontology information includes a recognition target ID for identifying the concept, a superordinate ID for identifying the superordinate concept, and concept name information for verbally expressing the concept. The recognition target ID is common to recognition target ID described below regarding the moving image data storage unit M2.

Figure 2:
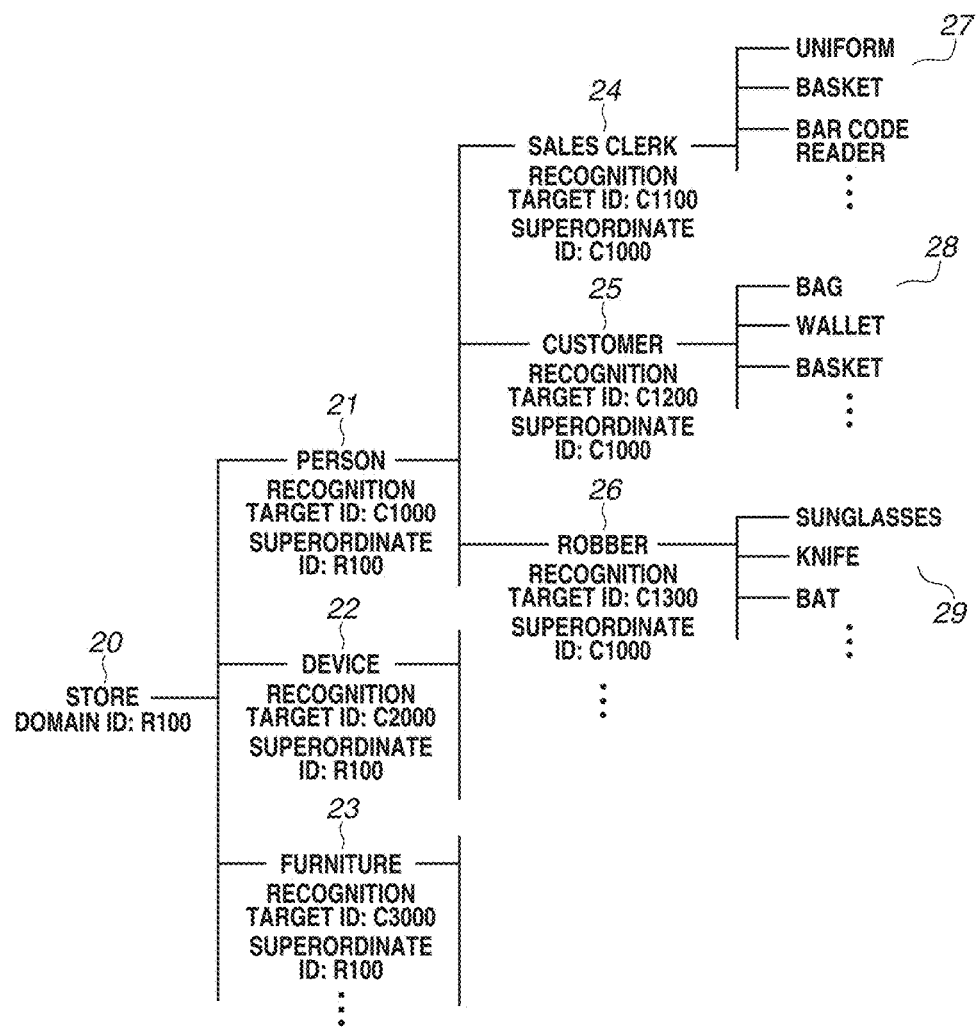
FIG. 2 illustrates an example of ontology information according to the first exemplary embodiment.

FIG. 2 illustrates an example of the ontology information stored in the ontology storage unit M1. FIG. 2 illustrates that domain name information "store" 20 and a plurality of concept information pieces 21 to 29 are connected in a tree structure. Specifically, in the ontology information in FIG. 2, concept information "person" 21, concept information "device" 22, and concept information "furniture" 23 are described as superordinate concepts constituting the domain name information "store" as a root. The has-a relationship is used between the domain name information "store" 20 and the concept information pieces 21 to 23. In other words, the "store" 20 is constituted by including the "person" 21, the "device" 22, and the "furniture" 23. In each concept information, the recognition target ID for identifying the concept and the superordinate ID for identifying the superordinate concept are described in addition to the concept name information. Further, each concept information is connected to superordinate and subordinate concept information pieces like a rosary. For example, the concept information "person" 21 includes a "sales clerk" 24, a "customer" 25, a "robber" 26, and the like as the subordinate concept information pieces. The is-a relationship is used between the concept information "person" 21 and the subordinate concept information pieces 24 to 26. In other words, the concept information pieces "sales clerk" 24, "customer" 25, and "robber" 26 are types of the concept information "person" 21. Further, the concept information pieces "sales clerk" 24, "customer" 25, and "robber" 26 are connected to subordinate concept information pieces 27 to 29 in the has-a relationship. As described above, the ontology information is developed by alternately repeating the has-a relationship and the is-a relationship with respect to the specific domain name information FIG. 3 is a table of an example of information pieces stored in the ontology storage unit M1 according to the present exemplary embodiment. As illustrated in FIG. 3, the domain ID is a character string constituted of, for example, alphabets and numerals. For example, two domains are distinguished by a domain ID "R100" and a domain ID "R200". In FIG. 3, the domain ID "R100", the domain name information "store", and the ontology information are stored by being associated with the domain ID "R100". Further, the domain ID "R200", the domain name information "station", and the ontology information are stored by being associated with the domain ID "R200". In other words, a line in the table corresponds to the ontology information of the specific domain, and the entire table corresponds to an assembly of the ontology information pieces. The ontology information is visualized in the tree structure in FIG. 2 to visually facilitate the understanding, however, is stored as text data expressed using Unified Modeling Language (UML) and the like in the ontology storage unit M1.

Returning to the description of FIG. 1, the moving image data storage unit M2 stores the recognition target ID for identifying the recognition target, recognition target name information for verbally expressing the recognition target, a moving image datum, and data type information expressing a type of data in association with data ID. The data ID is information for identifying the moving image datum which is each piece of moving image data, and the recognition target ID is information for identifying the recognition target preliminarily set by the provider. The recognition target ID is common to the recognition target ID for identifying the concept information described above in the description of the ontology storage unit M1. The recognition target name information is obtained by expressing each recognition target preliminarily set by the provider in words. The recognition target name information includes, for example, a "person", a "vehicle", "walking", "running", a "bag", and a "basket". The recognition target name information further includes coordinates and a magnitude of an area of an object on a moving image. The moving image datum is a piece of moving image data preliminarily determined as belonging to the recognition target by the provider. The data type information is information for distinguishing whether the moving image datum is for training or for evaluation.

FIG. 4 is a table of an example of information pieces stored in the moving image data storage unit M2 according to the present exemplary embodiment. As illustrated in FIG. 4, the data ID and the recognition target ID are character strings constituted of, for example, alphabets and numerals. For example, two data pieces are distinguished by a data ID "D0001" and a data ID "D0002". Further, two recognition targets are distinguished by a recognition target ID "C1000" and a recognition target ID "C1100". As illustrated in FIG. 4, the recognition target name information includes verbal information expressing a state of the object as a "person" and a "sales clerk" and also coordinates and a magnitude of the object on a moving image. The area is expressed in the order of an x coordinate, a y coordinate, a height, and a width. Specifically, in FIG. 4, label information of the data ID "D0001" indicates that a state of the object is a "person", coordinates of the area is (500, 10), and a height and a width of the area are respectively 180 and 50. In addition, FIG. 4 illustrates that the data ID "D0001", the recognition target ID "C1000", the recognition target name information "person", the area: (500, 10, 180, 50), and the moving image datum are associated with the data ID "D0001". Further, FIG. 4 illustrates that the data ID "D0002", the recognition target ID "C1100", the label information "sales clerk", the area: (200, 200, 180, 50), and the moving image datum are associated with the data ID "D0002". In other words, a line in the table corresponds to the moving image datum, and the entire table corresponds to the moving image data.

When the moving image datum is stored in an external storage apparatus, an address indicating a location of the moving image datum on the relevant storage apparatus is stored in the moving image datum. To the external apparatus, for example, a server on a cloud connected via the Internet and the like can be applied. To the address, for example, an internet protocol (IP) address and a uniform resource locator (URL) can be applied.

With reference to FIG. 1 again, a configuration of the recognition training apparatus 10 is described. The semantic relevance generation unit 11 generates semantic relevance of the specific domain and the concept information based on the ontology information. Specifically, in response that the domain ID and the operation information "execution of pre-training" are input and instructed from the terminal apparatus 100, the semantic relevance generation unit 11 reads the domain ID, the domain name information, and the ontology information associated with the input domain ID from the ontology storage unit M1. The semantic relevance generation unit 11 generates the semantic relevance with respect to the domain for each concept information included in the read ontology information based on the read ontology information. As a generation method of the semantic relevance, for example, there are three methods described below.

As a first semantic relevance generation method, the semantic relevance generation unit 11 generates the semantic relevance of each concept information to be inversely proportional to a depth (hierarchy) of each concept information in the tree structure of the read ontology information. For example, in the tree structure of the ontology information regarding the domain name information "store" 20 in FIG. 2, the concept information pieces "person" 21, "device" 22, and "furniture" 23 have the highest semantic relevance, and the concept information pieces "sales clerk" 24, "customer" 25, and "robber" 26 have the next highest semantic relevance. Specifically, semantic relevance Ri (cj) of concept information cj to a domain i is defined, for example, by a following Equation 1 so as to become lower as the concept information is in a lower hierarchy in the tree structure.

[Equation 1]

$$R_i(c_j) = \frac{1}{h_i(c_j)} \quad \text{(Equation 1)}$$

Here, hi (cj) indicates a hierarchy of the concept information cj in the ontology information of the domain i, and a maximum value of the semantic relevance Ri (cj) is one.

As a second semantic relevance generation method, the semantic relevance generation unit 11 generates the semantic relevance of each concept information to be proportional to an occurrence frequency of each concept information in the tree structure of the ontology information in addition to the value inversely proportional to the depth by the first semantic relevance generation method. For example, in the tree structure of the ontology information regarding the domain name information "store" 20 in FIG. 2, the concept information "basket" appears twice as information pieces 27 and 28, so that the concept information "basket" has higher semantic relevance even in the lower hierarchy. Specifically, the semantic relevance Ri (cj) of the concept information cj to the domain i is defined, for example, by a following Equation 2.

[Equation 2]

$$R_i(c_j) = \frac{1}{h_i(c_j)} + \frac{N_i(c_j)}{\max_l(N_i(c_l))} \quad \text{(Equation 2)}$$

Here, Ni (xj) indicates the number of occurrences of the concept information cj in the ontology information of the domain i, and the maximum value of the semantic relevance Ri (cj) is two.

As a third semantic relevance generation method, the semantic relevance generation unit 11 generates the number of descendants (i.e., the number of the concept information pieces in a lower hierarchy than the relevant candidate) of each concept information in the tree structure of the ontology information as the semantic relevance. For example, in the tree structure of the ontology information regarding the domain name information "store" 20 in FIG. 2, the concept information "person" 21 corresponds to the number of the concept information pieces of the descendants 24 to 29.

In addition, the semantic relevance generation unit 11 outputs, to the recognition target selection unit 12, an assembly of combinations of the concept information included in the read ontology information and the generated semantic relevance information and the read ontology information together with the input domain ID.

The recognition target selection unit 12 selects the recognition target from among the concept information pieces based on the semantic relevance information. Specifically, in response that the domain ID, the assembly of combinations of the semantic relevance information and the concept information, and the ontology information are input from the semantic relevance generation unit 11, the recognition target selection unit 12 selects the recognition target from the assembly of concept information pieces based on the semantic relevance information. In other words, the input concept information is the recognition target candidate. As a selection method of the recognition target, for example, there are two methods described below.

As a first recognition target selection method, the recognition target selection unit 12 selects the concept information in a same combination of the semantic relevance having a predetermined threshold value or larger as the recognition target. The threshold value takes, for example, a value from zero to one and is normalized so that the semantic relevance becomes one or less. Specifically, when the semantic relevance generation unit 11 uses the first semantic relevance generation method, the maximum value of the semantic relevance is already one, so that the normalization is not performed. On the other hand, when the semantic relevance generation unit 11 uses the second semantic relevance generation method, the maximum value of the semantic relevance is two, and the normalization is performed by dividing the semantic relevance by two so that the maximum value becomes one.

As a second recognition target selection method, the recognition target selection unit 12 selects the concept information pieces at a predetermined ratio with respect to the number of the input concept information pieces as the recognition targets. Specifically, the input concept information pieces are sorted in descending order of the semantic relevance, and the concept information pieces at the predetermined ratio from the top are selected as the recognition targets. Although a detailed description is omitted, regarding the predetermined threshold value or the predetermined ratio used in the recognition target selection method, a person can adjust numerical information displayed on the display unit DS of the terminal apparatus 100. In this case, the operation detection unit OP detects an operation indicating a change of the numerical information by a person and outputs the numerical information and the operation information to the recognition training apparatus 10. In response to the input of the numerical information and the operation information from the terminal apparatus 100, the recognition training apparatus 10 stores the numerical information as the predetermined threshold value or the predetermined ratio in the storage unit included in the own apparatus.

Next, the recognition target selection unit 12 extracts the recognition target ID for identifying the selected recognition target and the semantic relevance in the same combination of the recognition target respectively from the assembly of combinations of the input concept information and the semantic relevance. Further, the recognition target selection unit 12 outputs an assembly of combinations of the extracted recognition target ID and semantic relevance together with the input domain ID and the ontology information to the recognition training unit 13.

The recognition training unit 13 trains the recognizer using training data regarding the selected recognition target. Specifically, in response that the domain ID, the ontology information, and the assembly of combinations of the recognition target ID and the semantic relevance are input from the recognition target selection unit 12, the recognition training unit 13 retains the recognition target ID matching with the input recognition target ID. The recognition training unit 13 reads a line in which the data type information is "training" from the moving image data storage unit M2. The read line includes the recognition target name information, the recognition target ID, and the moving image datum. The recognition training unit 13 trains the recognizer which has the read moving image datum as an input and the read recognition target ID as an output. When the moving image data is a still image, and the recognition target is a type of an object, for example, a region-based CNN (R-CNN) (Ross Girshick, Jeff Donahu, Trevor Darrel, and Jitendra Malik, 2014, "Rich feature hierarchies for accurate object detection and semantic segmentation", IEEE Conference on Computer Vision and Pattern Recognition (CVPR)) can be applied to the recognizer. When the moving image data is a moving image, and the recognition target is an action of an object, a three-dimensional (3D) CNN (S. Ji, W. Xu, M. Yang and K. Yu, 2012, "3D Convolutional Neural Networks for Human Action Recognition", Pattern Analysis and Machine Intelligence, vol. 35, no. 1, pp. 221-231) and a two-stream CNN (K. Simonyan and A. Zisserman, 2014, "Two-stream convolutional networks for action recognition in videos", Advances in Neural Information Processing System 25 (NIPS)) can be applied. In addition, the recognizer may be a combination of a predetermined characteristic amount extraction corresponding to a still image and a moving image and a classifier such as a support vector machine.

Processing by the recognition training unit 13 when the R-CNN is used as the recognizer is specifically described here. The recognition training unit 13 successively performs processing described below on each line in the read moving image data. First, the recognition training unit 13 extracts candidates of areas of a plurality of objects from a still image as the moving image datum of each line and calculates a ratio that the candidate overlaps with the area of the object stored in the recognition target name information of each line. When the ratio is greater than the predetermined threshold value, the recognition training unit 13 determines that the candidate of the area of the object is the recognition target name information of the relevant line and generates a patch image which is obtained by cutting the candidate of the area of the object from the moving image datum. The recognition training unit 13 adds one or a plurality of generated patch images and the recognition target ID of the relevant line to a training data assembly as a combination of input and output of the R-CNN. After applying the processing to all of the read lines, the recognition training unit 13 trains the CNN using the training data assembly. The recognition training unit 13 randomly determines an initial value of a parameter of the CNN.

The recognition training unit 13 generates importance information of each recognition target based on the assembly of the input semantic relevance. Specifically, importance information $I_j(c_j)$ of a recognition target $c_j$ in the domain $i$ is defined, for example, by a following Equation 3 so as to be proportional to the semantic relevance.

[Equation 3]

$$I_i(c_j) = \alpha R_i(c_j) \quad \text{(Equation 3)}$$

Here, $\alpha$ is a proportionality constant. The recognition training unit 13 trains the R-CNN to prioritize recognition accuracy of the recognition target having higher importance information. Specifically, as in a following Equation 4, the importance information $I_i(c_j)$ is applied as a weight to an identification error of the domain $i$ in which the R-CNN is minimized.

[Equation 4]

$$E_i \equiv \frac{1}{2} \sum_{n=1}^{N} \sum_{j=1}^{C} I_i(c_j)(y_j^n - t_j(x^n))^2 \quad \text{(Equation 4)}$$

Here, N is the number of the training data pieces, C is the number of the recognition targets included in the training data, yn is a vector of magnitude of the number of the recognition targets corresponding to an output of the n-th training data. Each element of the n-th y takes a value of one when corresponding to the output of the training data and a value of zero in a case other than that. xn corresponds to an input of the n-th training data. The input is the patch image generated by the above-described method. ti is an output value predicted by the R-CNN with respect to the input data xn and a vector of magnitude of the number of the recognition targets.

Next, the recognition training unit 13 stores the trained parameter of the recognizer and the assembly of combinations of the input recognition target ID and the input semantic relevance in association with the input domain ID in the recognizer storage unit M3. The parameter of the recognizer is, for example, a model parameter of the R-CNN. The recognition training unit 13 outputs the input domain ID, the ontology information, and the assembly of the recognition target IDs to the recognition target visualization unit 14. Further, the recognition training unit 13 stores the domain ID, the parameter of the recognizer associated with the domain ID, the assembly of the input recognition target IDs, and the assembly of the input semantic relevance in the recognizer storage unit M3 described below. The recognizer storage unit M3 stores the parameter of the recognizer. Specifically, the recognizer storage unit M3 stores the domain ID, the parameter of the recognizer, the assembly of the recognition target IDs, and the assembly of the semantic relevance therein in association with the domain ID.

FIG. 5 is a table of an example of information stored in the recognizer storage unit M3 according to the present exemplary embodiment. In the recognizer storage unit M3, the parameter of the recognizer, the assembly of the recognition target IDs selected by the recognition target selection unit 12 based on the semantic relevance, and the assembly of the semantic relevance generated by the semantic relevance generation unit 11 are stored in each line in association with the domain ID.

The recognition target visualization unit 14 displays recognition target information expressing the selected recognition target by superimposing on the ontology information. The recognition target visualization unit 14 calculates the recognition accuracy of the recognizer with respect to each recognition target selected by the recognition target selection unit 12 from evaluation data and generates the recognition target visualized information. Specifically, the recognition target visualization unit 14 reads the parameter of the recognizer associated with the domain ID from the recognizer storage unit M3 in response that the domain ID, the ontology information, and the assembly of the recognition target IDs are input from the recognition training unit 13. In addition, the recognition target visualization unit 14 reads a line in which the input recognition target ID matches with the recognition target ID, and the data type information is "evaluation" from the moving image data storage unit M2. The recognition target visualization unit 14 generates a patch image based on information of each read line and generates evaluation data which is an assembly of input and output pairs in a similar manner of the processing described regarding the recognition training unit 13. Further, the recognition target visualization unit 14 applies the evaluation data to a model of the R-CNN developed from the read recognizer parameter and calculates the recognition accuracy with respect to each recognition target. As a calculation method of the recognition accuracy, the recognition target visualization unit 14 calculates, for example, a ratio that an element taking a maximum value of a prediction result tj (xn) of the R-CNN with respect to an input xn of the n-th evaluation data matches with an output of the n-th evaluation data. In other words, the recognition target visualization unit 14 calculates accuracy with respect to each recognition target.

The recognition target visualization unit 14 generates the recognition target visualized information visually expressing the recognition target of the recognizer based on the assembly of the input recognition target IDs and the ontology information. As a specific generation method of the recognition target visualized information, the recognition target visualization unit 14 generates a tree structure connecting between texts of a plurality of the concept name information pieces by edges as the recognition target visualized information based on the concept name information pieces and the superordinate IDs of a plurality of the concept information pieces included in the input ontology information. When the recognition target ID stored in each concept information is included in the assembly of the input recognition target IDs, the recognition target information indicating that the relevant concept information is the recognition target is superimposed on the recognition target visualized information. The recognition target visualization unit 14 may superimpose the calculated recognition accuracy of each recognition target on the recognition target visualized information together with the concept information having the recognition target ID matching with the input recognition target ID as the recognition target information. The recognition target visualization unit 14 outputs the generated recognition target visualized information to the terminal apparatus 100.

Figure 6:
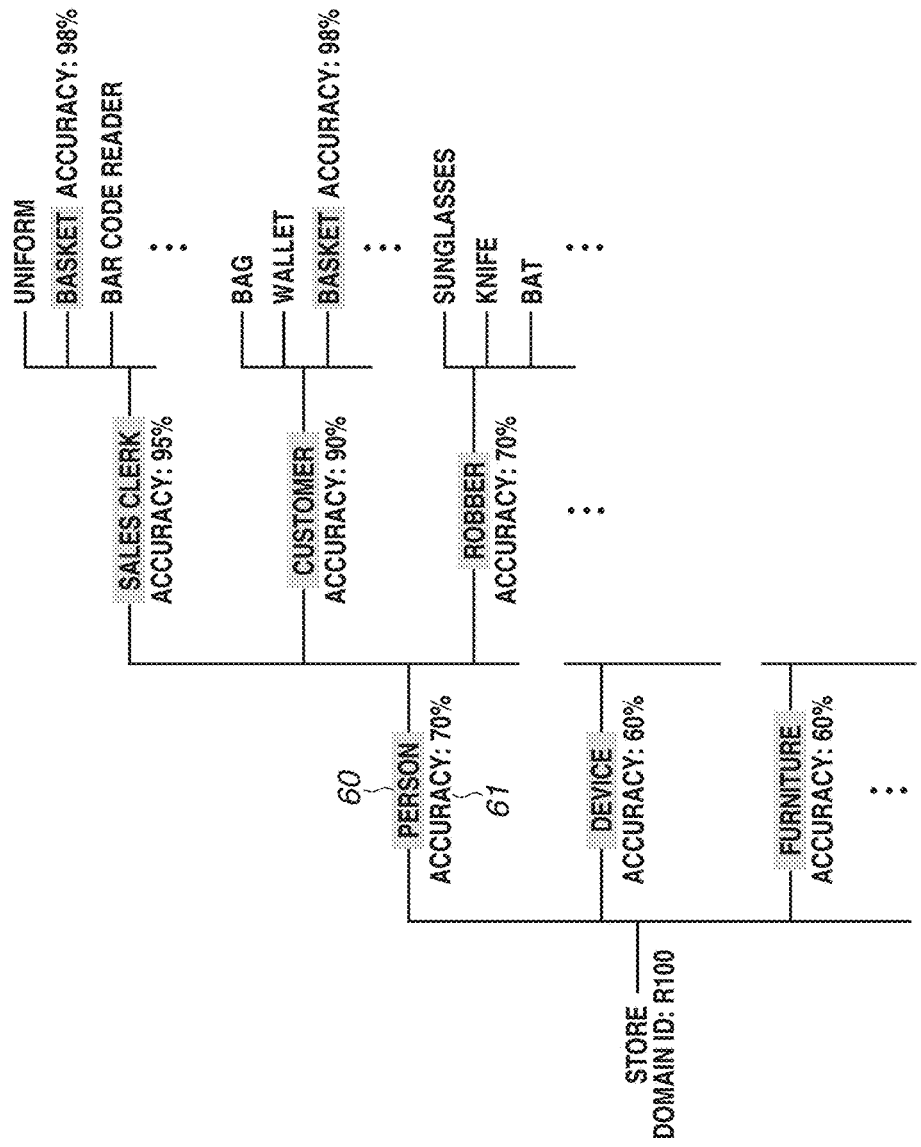
FIG. 6 illustrates an example of recognition target visualized information according to one or more aspects of the present disclosure.

FIG. 6 illustrates an example of the recognition target visualized information generated by the recognition target visualization unit 14. In FIG. 6, the concept information "person" is described on a rectangle 60 of the recognition target information indicating the recognition target in the tree structure in which the domain name information "store" and a plurality of the concept information pieces are connected as with FIG. 2. In addition, recognition accuracy 61 with respect to the recognition target is described as the recognition target information.

Figure 7:
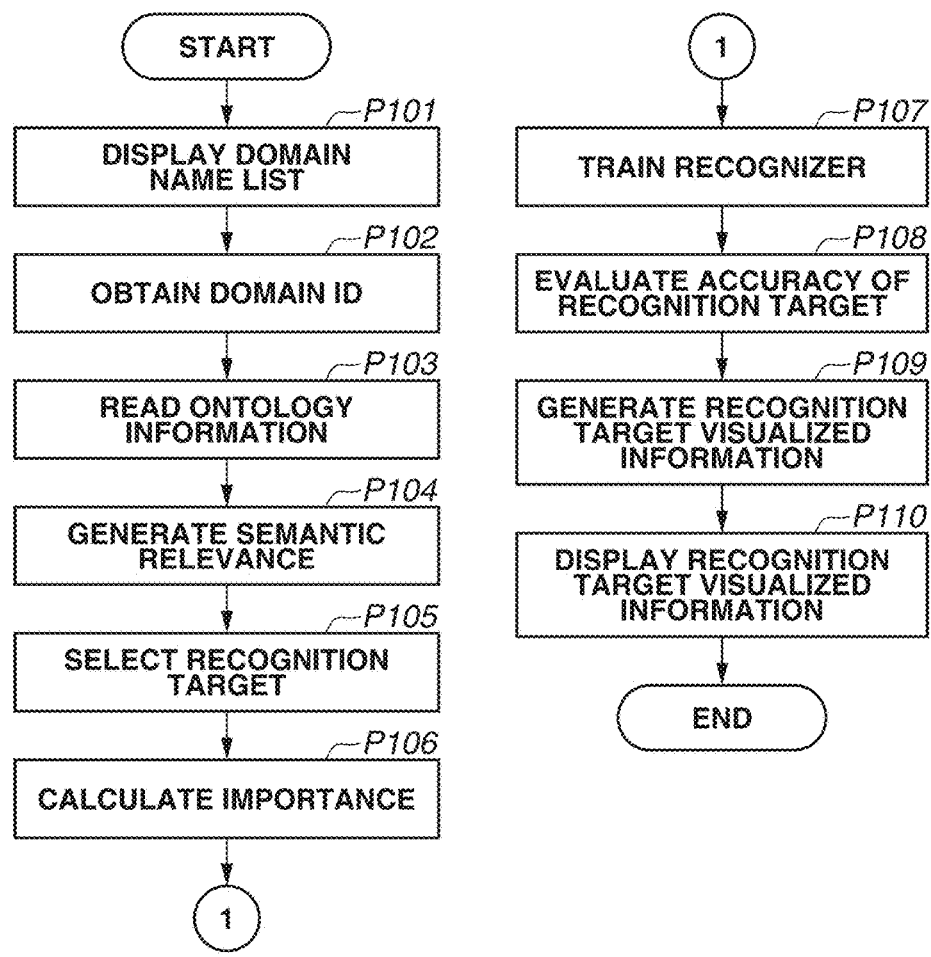
FIG. 7 is a flowchart illustrating an example of pre-training of a recognizer according to one or more aspect of the present disclosure.

Next, operations of the recognition training apparatus 10 in the recognition training system 1 are described with reference to FIG. 7. FIG. 7 is a flowchart illustrating an example of pre-training of the recognizer of the recognition training apparatus 10 in the recognition training system 1 according to the present exemplary embodiment. First, in step P101, the terminal apparatus 100 displays a domain name information list. Specifically, the terminal apparatus 100 displays a list of the predetermined domain name information stored in advance on the display unit DS.

Next, in step P102, the terminal apparatus 100 outputs the domain ID to the recognition training apparatus 10. Specifically, the operation detection unit OP of the terminal apparatus 100 detects selection by a person and the operation information of "execution of pre-training" with respect to the list of the domain name information displayed on the display unit DS. In response to the detection, the terminal apparatus 100 obtains the domain ID stored in the own apparatus for identifying the selected domain name information. Subsequently, the terminal apparatus 100 outputs the obtained domain ID to the recognition training apparatus 10.

Processing in step P103 and subsequent steps described below is processing in the recognition training apparatus 10. First, in step P103, the semantic relevance generation unit 11 reads the ontology information. Specifically, in response that the domain ID is input from the terminal apparatus 100, the semantic relevance generation unit 11 reads the ontology information associated with the domain ID from the ontology storage unit M1.

Next, in step P104, the semantic relevance generation unit 11 generates the semantic relevance. Specifically, the semantic relevance generation unit 11 generates the semantic relevance to the read domain name information for all of the concept information pieces included in the read ontology information using the above-described semantic relevance generation method. Subsequently, the semantic relevance generation unit 11 outputs the input domain ID and an assembly of combinations of the concept information included in the read ontology information and the generated semantic relevance to the recognition target selection unit 12.

Next, in step P105, the recognition target selection unit 12 selects the recognition target. Specifically, in response that the domain ID and the assembly of combinations of the concept information and the semantic relevance are input from the semantic relevance generation unit 11, the recognition target selection unit 12 selects the recognition target from the input concept information assembly using the above-described recognition target selection method. Subsequently, the recognition target selection unit 12 extracts an assembly of combinations of the recognition target ID for identifying the selected the recognition target and the semantic relevance from the assembly of combinations of the input concept information and the semantic relevance and output the extracted assembly together with the input domain ID the ontology information to the recognition training unit 13.

Next, in step P106, the recognition training unit 13 calculates the importance information. Specifically, in response that the domain ID, the ontology information, the recognition target ID, and the semantic relevance are input from the recognition target selection unit 12, the recognition training unit 13 calculates the importance information of each recognition target ID based on the semantic relevance using the above-described importance information generation method.

Next, in step P107, the recognition training unit 13 performs pre-training on the recognizer. Specifically, the recognition training unit 13 reads a line which includes the recognition target ID same as the input recognition target ID and "training" in the data type information from the moving image data storage unit M2. The recognition training unit 13 generates the training data which is an assembly of combinations of input and output from the information pieces stored in each of the read lines. Further, the recognition training unit 13 trains the recognizer based on the training data and the calculated importance information. Subsequently, the recognition training unit 13 stores the parameter of the recognizer. Specifically, the input domain ID and the parameter of the trained recognizer are stored in association with an assembly of the domain IDs in the recognizer storage unit M3. The recognition training unit 13 outputs the input domain ID, the ontology information, and the assembly of the recognition target IDs to the recognition target visualization unit 14.

Next, in step P108, the recognition target visualization unit 14 measures accuracy of the recognition target. Specifically, in response that the domain ID, the ontology information, and the assembly of the recognition target IDs are input from the recognition training unit 13, the recognition target visualization unit 14 reads the parameter of the recognizer associated with the domain ID from the recognizer storage unit M3. Further, the recognition target visualization unit 14 reads a line which includes the recognition target ID same as the input recognition target ID and "evaluation" in the data type information from the moving image data storage unit M2. Subsequently, the recognition target visualization unit 14 generates the evaluation data which is an assembly of combinations of input and output from the information pieces stored in each of the read lines and calculates the recognition accuracy, such as Precision with respect to each recognition target of the recognizer constituted of the parameter of the read recognizer.

Next, in step P109, the recognition target visualization unit 14 generates the recognition target visualized information. Specifically, the recognition target visualization unit 14 generates the recognition target visualized information based on the concept information stored in the input ontology information, the calculated recognition accuracy, and the assembly of the input recognition target IDs using the above-described recognition target visualized information generation method. Further, the recognition target visualization unit 14 outputs the generated recognition target visualized information to the terminal apparatus 100. The processing described so far is the processing in the recognition training apparatus 10.

Next, in step P110, the terminal apparatus 100 displays the recognition target visualized information. Specifically, in response that the recognition target visualized information is input from the recognition target visualization unit 14 of the recognition training apparatus 10, the terminal apparatus 100 displays the input recognition target visualized information on the display unit DS. Then, the terminal apparatus 100 terminates the processing.

As described above, the recognition training apparatus according to the present exemplary embodiment selects the recognition target semantically related to the domain based on the ontology information conceptually expressing the domain in which the recognizer is used. Further, the recognition training apparatus performs pre-training on the recognizer using the training data regarding the recognition target. Accordingly, a load for the provider of the recognizer to select the recognition target for the pre-training from an enormous number of the recognition target candidates can be remarkably reduced. In addition, the pre-training can be performed by limiting to the recognition target related to the specific domain, so that complexity of the recognizer can be suppressed, and it is expected that overfit in the pre-training can be avoided.

The recognition target visualization unit 14 of the recognition training apparatus displays the selected recognition target by superimposing on the ontology information, so that the recognition target of the pre-trained recognizer can be visualized with respect to a comprehensive concept assembly semantically related to the domain. Accordingly, the provider and the user of the recognizer can intuitively understand an application range of the pre-trained recognizer with respect to the domain. Further, the provider and the user can have an understanding of the common concept structure with respect to the specific domain and smoothly provide and accept the recognizer.

The recognition target visualization unit of the recognition training apparatus generates the recognition accuracy of the pre-trained recognizer with respect to each recognition target and display the recognition accuracy by superimposing on the ontology information. Accordingly, the provider and the user of the recognizer can intuitively and quantitatively understand the application range of the pre-trained recognizer with respect to the domain.

The recognition training unit of the recognition training apparatus generates the importance information of the recognition target selected based on the semantic relevance and performs the pre-training on the selected recognition target by weighting based on the importance information. Accordingly, the pre-training of the accuracy of the recognizer can be performed on the recognition target required by more users in the specific domain.

Next, a second exemplary embodiment according to the present disclosure is described. The configurations same as those according to the above-described first exemplary embodiment are denoted by the same reference numerals, and the descriptions thereof are omitted. A recognition training system 1a according to the present exemplary embodiment is described using a case in which the pre-trained recognizer is subjected to fine-tuning as an example. In other words, a recognition training apparatus 10a according to the present exemplary embodiment is described on the assumption that the pre-training of the recognizer is finished according to the first exemplary embodiment, and processing is started from a state in which the recognition target visualized information is displayed on the terminal apparatus 100. Further, the present exemplary embodiment is different from the first exemplary embodiment at a point that the recognition training apparatus 10a adaptively trains the recognizer based on the operation information expressing feedback from the user to the recognition target visualized information.

Figure 8:
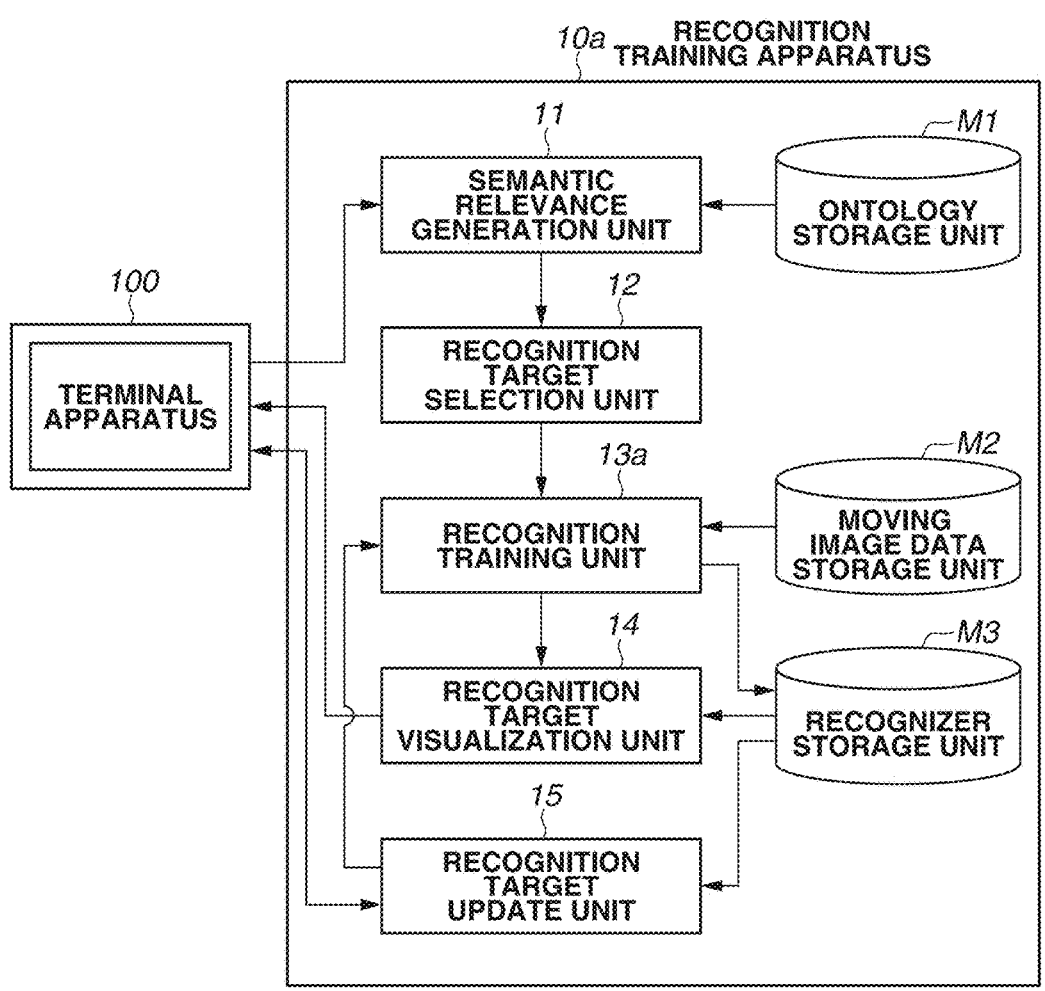
FIG. 8 is a schematic block diagram illustrating an example of a configuration of a recognition training system according to one or more aspects of the present disclosure.

FIG. 8 illustrates an example of a configuration of the recognition training system 1a according to the second exemplary embodiment of the present disclosure. The recognition training system 1a includes the recognition training apparatus 10a and the terminal apparatus 100. The operation detection unit OP of the terminal apparatus 100 detects the operation information to the display unit DS by a person and outputs the domain ID corresponding to the selected domain name information and the detected operation information to the recognition training apparatus 10a similar to the first exemplary embodiment. The operation information includes "addition" and "deletion" of the recognition target, "execution of fine-tuning", and the like from a person to the recognition target visualized information displayed on the display unit DS in addition to the operation information according to the first exemplary embodiment. Buttons are displayed on the display unit DS for receiving the operation information from a person.

Figure 9:
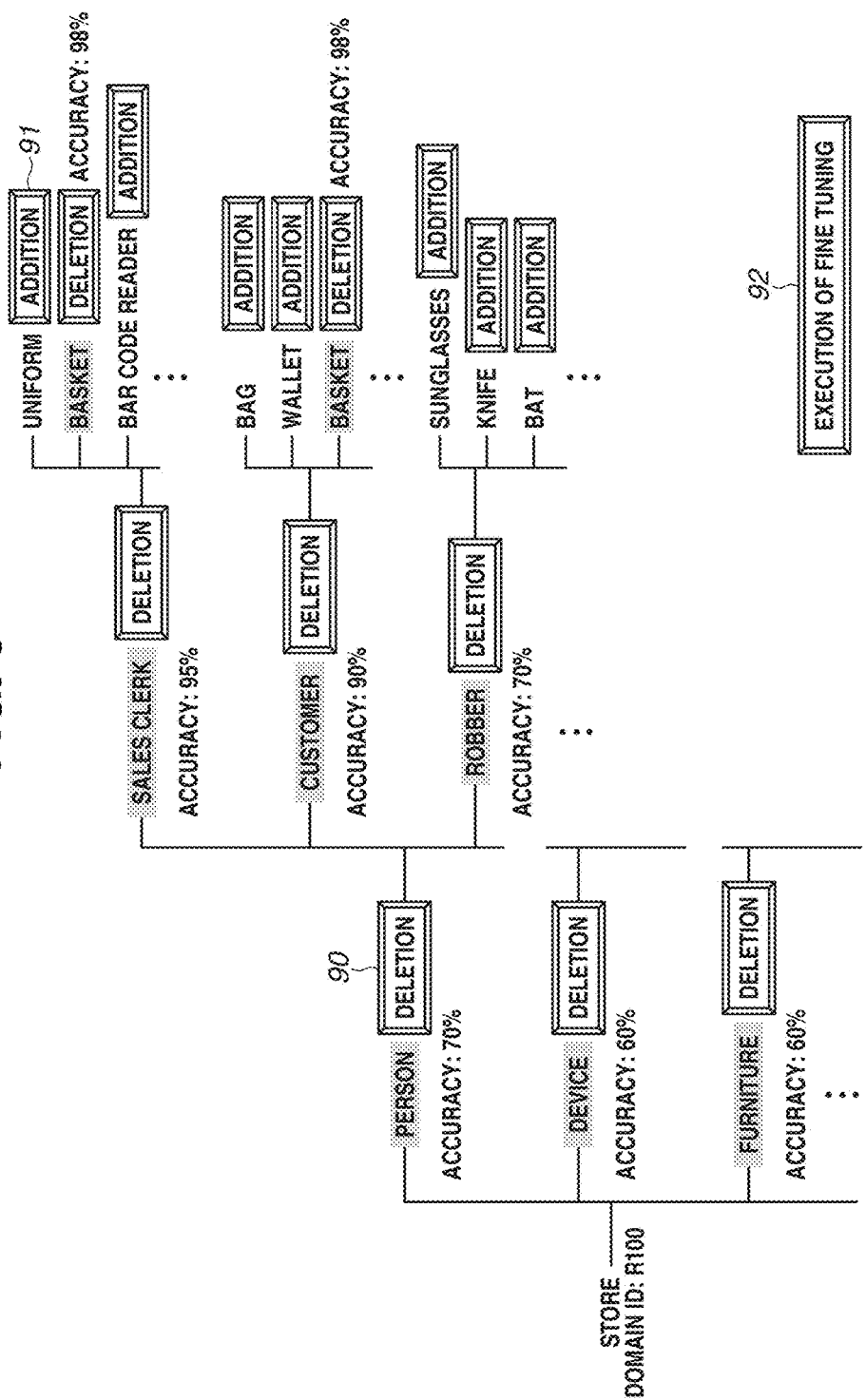
FIG. 9 illustrates an example of recognition target visualized information displayed on a display unit according to one or more aspects of the present disclosure.

FIG. 9 illustrates an example of the recognition target visualized information and buttons for receiving the operation information displayed on the display unit DS of the terminal apparatus 100. As illustrated in FIG. 9, a "deletion" button 90 is displayed next to the concept information which is the recognition target of the pre-training. Further, an "addition" button 91 is displayed next to the concept information which is not the recognition target of the pre-training. Furthermore, an "execution of fine-tuning" button 92 is displayed. The operation detection unit OP detects the operation information indicating the pressing of the "deletion" button 90, the "addition" button 91, or the "execution of fine-tuning" button 92 by a person. When the operation information is "deletion", the terminal apparatus 100 deletes the recognition target ID of the "deletion" target from the assembly of the recognition target IDs stored in the recognition target visualized information. On the other hand, when the operation information is "addition", the terminal apparatus 100 adds the recognition target ID of the "addition" target to the assembly of the recognition target IDs stored in the recognition target visualized information. The display unit DS displays again the updated recognition target visualized information. When the operation information is "execution of fine-tuning", the terminal apparatus 100 outputs the operation information together with the assembly of the domain IDs and the recognition target IDs stored in the recognition target visualized information to the recognition training apparatus 10a.

Returning to the description of FIG. 8, the recognition training apparatus 10a is an apparatus for performing fine-tuning on the recognizer with respect to the specific domain. The recognition training apparatus 10a includes the ontology storage unit M1, the moving image data storage unit M2, the recognizer storage unit M3, the semantic relevance generation unit 11, the recognition target selection unit 12, a recognition training unit 13a, the recognition target visualization unit 14, and a recognition target update unit 15.

The recognition target update unit 15 updates the recognition target based on the operation information indicating an operation by a person to the recognition target visualized information displayed on the display unit DS of the terminal apparatus 100. Specifically, the recognition target update unit 15 detects that the domain ID, the operation information "execution of fine-tuning", and the assembly of the recognition target IDs are input from the terminal apparatus 100. In response to the input, the recognition target update unit 15 reads the parameter of the recognizer associated with the domain ID, the assembly of the recognition target IDs, and the assembly of the semantic relevance information pieces from the recognizer storage unit M3. Further, the recognition target update unit 15 updates the assembly of the read recognition target IDs and the read parameter of the recognizer based on the assembly of the input recognition target IDs. Specifically, the recognition target update unit 15 replaces the assembly of the read recognition target IDs with the assembly of the input recognition target IDs. Further, the recognition target update unit 15 updates the read parameter of the recognizer based on the input assembly of the recognition target IDs. As a parameter update method, there are two methods described below.

As a first parameter update method, when replacing the assembly of the read recognition target IDs with the assembly of the input recognition target IDs, the recognition target update unit 15 deletes a parameter related to the recognition target ID deleted from the assembly of the read recognition target IDs from the parameter of the recognizer. Specifically, the recognition target update unit 15 deletes a weight parameter used for connecting an output node corresponding to the deleted the recognition target ID and all nodes of a hidden layer in a fully connected network of an output layer of the R-CNN.

As a second parameter update method, when replacing the read recognition target ID with the assembly of the input recognition target IDs, the recognition target update unit 15 adds a parameter related to the recognition target ID added to the assembly of the read recognition target IDs to the parameter of the recognizer. Specifically, the recognition target update unit 15 adds a new output node corresponding to the added recognition target ID to the output layer of the R-CNN. Further, the recognition target update unit 15 randomly sets a weight parameter for connecting between the output node and the all nodes of the hidden layer.

The recognition target update unit 15 adjusts a training related parameter of the recognizer used by the recognition training unit 13a based on the assembly of the read recognition target IDs and the assembly of the input recognition target IDs. As an adjustment method of the training related parameter, there are, for example, two methods described below.

As a first training related parameter adjustment method, when the number of the read recognition target IDs replaced by the assembly of the input recognition target IDs is the predetermined threshold value or less, the recognition training unit 13 sets a training ratio of an upper layer of the R-CNN to a value substantially larger than that of a training ratio of a lower layer. For example, a weight parameter for the full connection of the output layer of the R-CNN is set to a tenfold or hundredfold value relative to a weight parameter of a convolutional layer and a pooling layer in the lower layer. In other words, the recognition target of the pre-trained recognizer is not largely changed, so that the lower layer corresponding to a low-level filter is not largely updated in the fine-tuning. On the other hand, in order to identify the newly added recognition target, a high-order fully connected network directly contributing thereto is largely updated.

As a second training related parameter adjustment method, when the number of the read recognition target IDs replaced by the assembly of the input recognition target IDs is greater than the predetermined threshold value, the recognition training unit 13 sets the training ratio of the R-CNN to a higher value in whole. For example, the weight parameter for the full connection of the output layer of the R-CNN is set to a value nearly equal to the weight parameter of the convolutional layer and the pooling layer in the lower layer. In other words, the recognition target of the pre-trained recognizer is largely changed, so that not only the high-order fully connected network but also the low-level filter are largely updated.

Further, the recognition target update unit 15 outputs the input domain ID, the assembly of the updated recognition target ID, the updated recognizer parameter, the adjusted training related parameter, and the assembly of the read semantic relevance to the recognition training unit 13a.

The recognition training unit 13a performs fine-tuning on the recognizer. Specifically, the recognition training unit 13a is input the domain ID, the recognizer parameter, the recognition target ID, the training related parameter, and the semantic relevance information from the recognition target update unit 15. Similar to the recognition training unit 13 according to the first exemplary embodiment, the recognition training unit 13a trains again the recognizer of the input domain ID. However, different from the first exemplary embodiment which performs training by the pre-training for randomly determining an initial value of the parameter of the recognizer, the recognition training unit 13a respectively sets the input recognizer parameter and the input training related parameter to the initial value and the training related parameter. The recognition training unit 13a stores the parameter of the trained recognizer, the assembly of the input recognition target IDs, and the assembly of the semantic relevance in association with the input domain ID to the recognizer storage unit M3.

Figure 10:
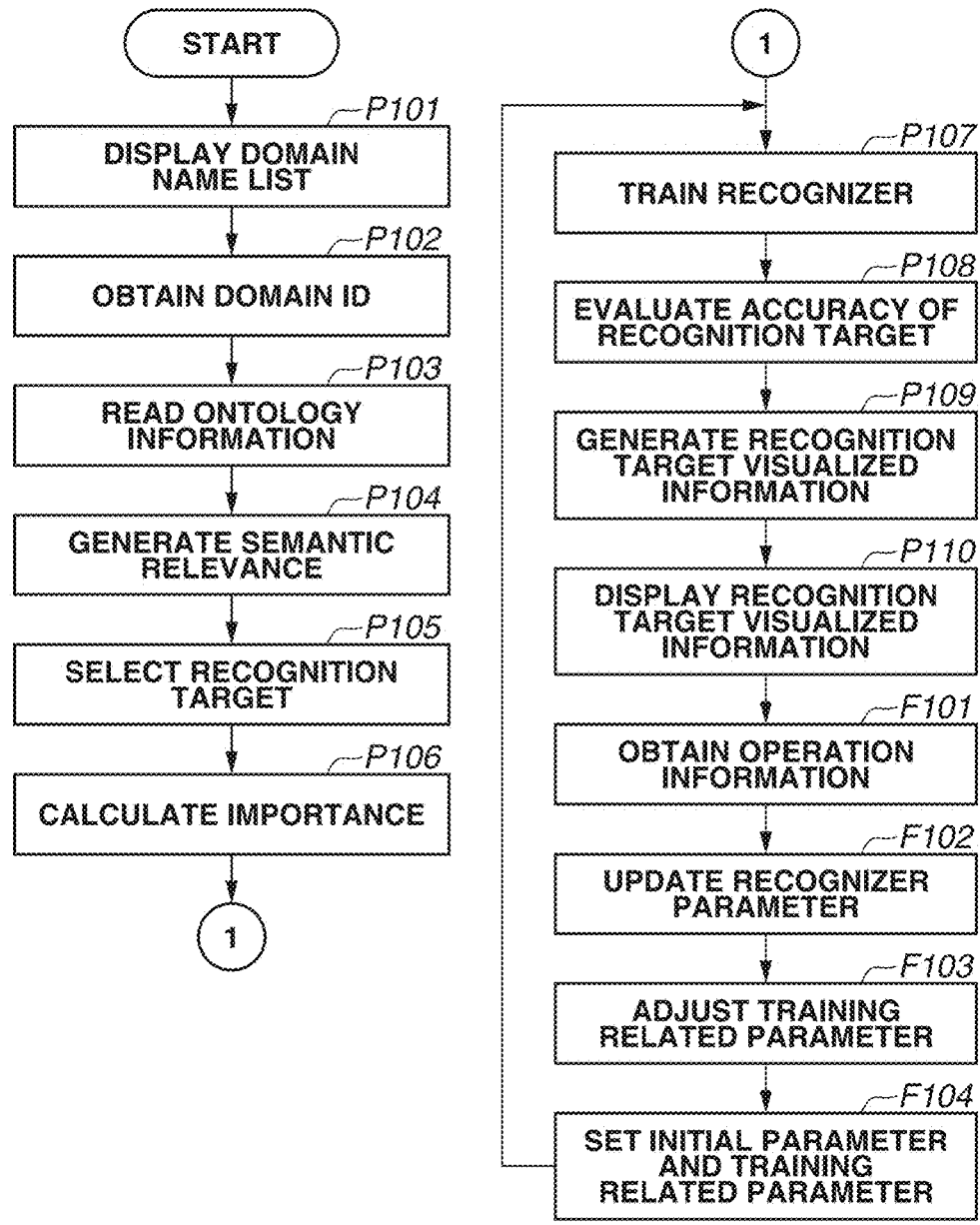
FIG. 10 is a flowchart illustrating an example of pre-training of a recognizer according to one or more aspects of the present disclosure.

Next, operations of the fine-tuning in the recognition training system 1a according to the present exemplary embodiment are described with reference to FIG. 10. FIG. 10 is a flowchart illustrating an example of the fine-tuning operations of the recognition training apparatus 10a in the recognition training system 1a according to the present exemplary embodiment. The operations same as those according to the first exemplary embodiment are denoted by the same step numbers, and descriptions thereof are omitted.

First, in step F101, the terminal apparatus 100 obtains the operation information. Specifically, the terminal apparatus 100 obtains the operation information "execution of fine-tuning" indicating an operation by a person to the recognition target visualized information displayed on the display unit DS. The terminal apparatus 100 outputs the obtained operation information and the domain ID and the assembly of the recognition target IDs stored in the recognition target visualized information to the recognition target update unit 15 of the recognition training apparatus 10a.

Each processing described below is performed in the recognition training apparatus 10a. First, in step F102, the recognition target update unit 15 updates the recognizer parameter. Specifically, in response that the domain ID and the assembly of the recognition target IDs are input, the recognition target update unit 15 reads the recognizer parameter associated with the input domain ID, the assembly of the recognition target IDs, and the assembly of the semantic relevance information pieces from the recognizer storage unit M3. The recognition target update unit 15 replaces the assembly of the read recognition target IDs with the assembly of the input recognition target IDs. Further, the recognition target update unit 15 updates the read recognizer parameter by the above-described parameter update method based on the assembly of the read recognition target IDs and the input recognition target IDs.

Next, in step F103, the recognition target update unit 15 adjusts the training related parameter. Specifically, the recognition target update unit 15 adjusts the training related parameter of the recognizer using the above-described training related parameter adjustment method based on the assembly of the read recognition target IDs and the assembly of the input recognition target IDs. The recognition target update unit 15 outputs the assembly of the updated recognition target IDs, the recognizer parameter, and the assembly of the read semantic relevance to the recognition training unit 13a.

Next, in step F104, the recognition training unit 13a sets the initial parameter and the training related parameter. Specifically, in response that the assembly of the recognition target IDs, the training related parameter, the recognizer parameter, and the assembly of the semantic relevance are input from the recognition target update unit 15, the recognition training unit 13a sets the initial parameter of the recognizer to the input recognizer parameter. Further, the recognition training unit 13a sets the training related parameter used for training of the recognizer to the input training related parameter. Subsequently, the recognition training unit 13a advances the processing to step P107.

As described above, the recognition training apparatus according to the present exemplary embodiment changes the recognition target and performs the fine-tuning thereon based on an operation by a person with respect to the recognition target of the recognizer displayed together with the ontology. Accordingly, the provider and the user of the recognizer can perform editing and the fine-tuning on the target range of the recognizer according to a specific use case on the domain by an intuitive operation while understanding a comprehensive recognition target necessary for the domain.

Next, a third exemplary embodiment for implementing the present disclosure is described with reference to the attached drawings. The configurations same as those according to the above-described first and second exemplary embodiments are denoted by the same reference numerals, and the descriptions thereof are omitted. A recognition training system 1b according to the present exemplary embodiment can be applied to a case in which fine-tuning is performed on a recognizer by adding unique moving image data owned by the user.

Figure 11:
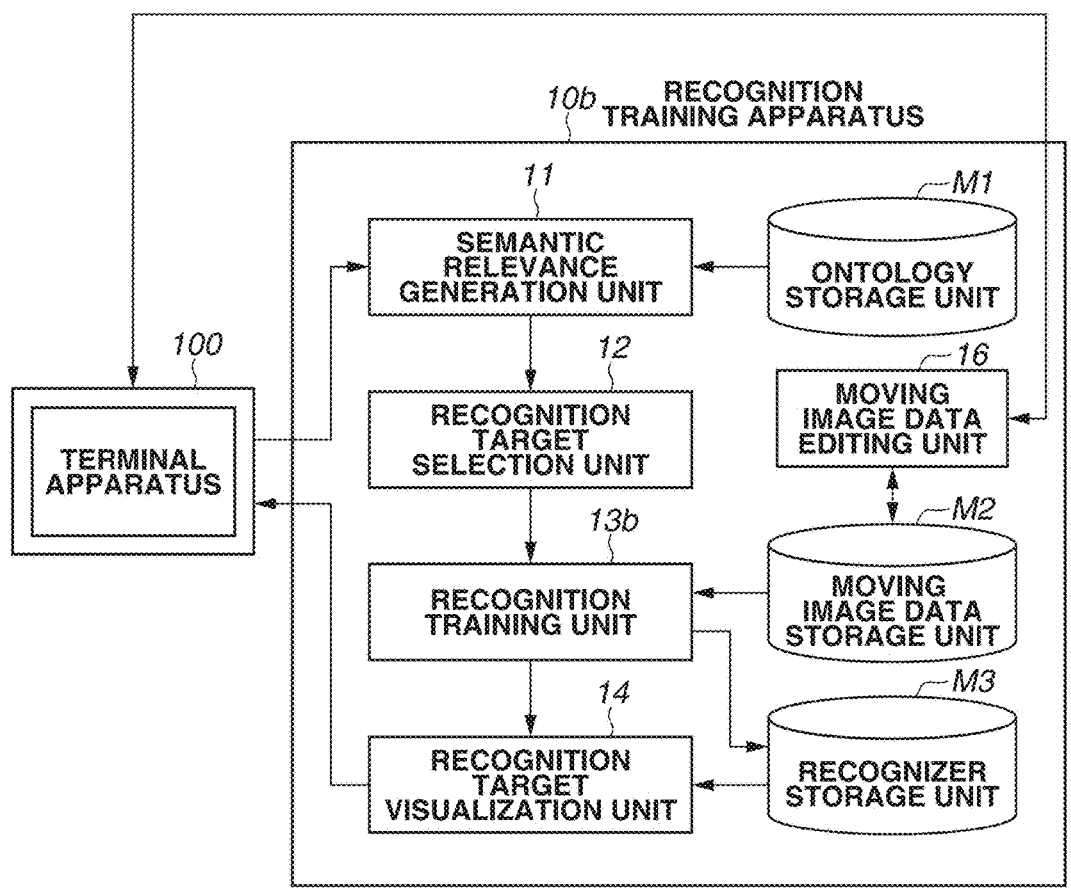
FIG. 11 is a schematic block diagram illustrating an example of a configuration of a recognition training system according to one or more aspects of the present disclosure.

FIG. 11 illustrates an example of a configuration of the recognition training system 1b according to the third exemplary embodiment of the present disclosure. The recognition training system 1b includes a recognition training apparatus 10b and the terminal apparatus 100.

The display unit DS of the terminal apparatus 100 displays the recognition target visualized information as with the first exemplary embodiment and also displays the moving image data used in the training of each recognition target. Specifically, the operation detection unit OP detects "display of image" operation information indicated by a click by a person to the concept information on the recognition target visualized information. When the operation information is "display of image", the terminal apparatus 100 outputs the recognition target ID for identifying the recognition target of a click target to a moving image data editing unit 16 of the recognition training apparatus 10b. Further, the operation detection unit OP detects the operation information "addition of image" indicated by a drag-and-drop of the moving image data with respect to the recognition target visualized information. When the operation information is "addition of image", the terminal apparatus 100 outputs the recognition target ID for identifying the concept information of the addition target, the added moving image data, and the recognition target name information to the moving image data editing unit 16 of the recognition training apparatus 10b.

Figure 12:
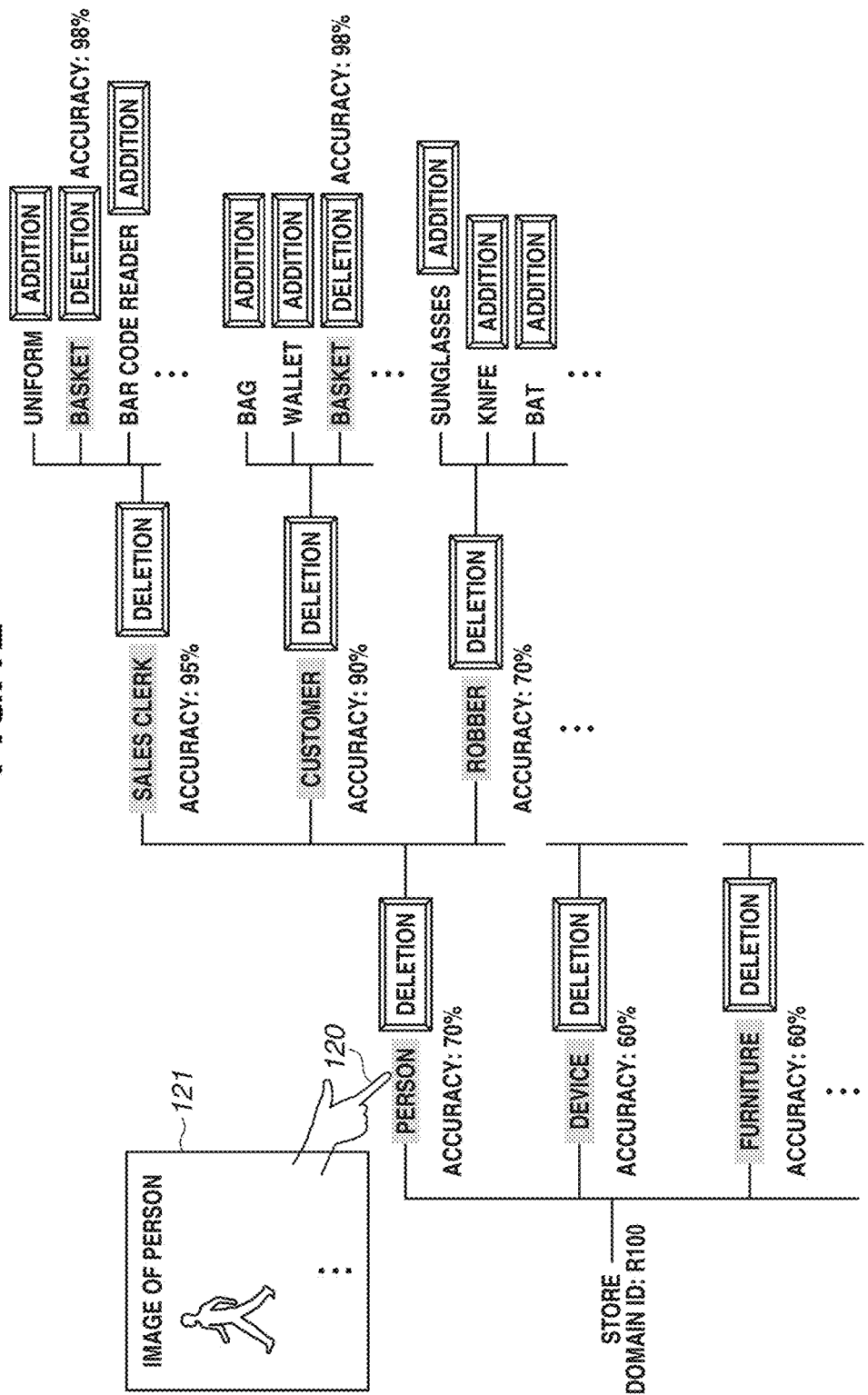
FIG. 12 illustrates an example of recognition target visualized information displayed on a display unit according to one or more aspects of the present disclosure.

FIG. 12 illustrates an example of display of the recognition target visualized information and the moving image data used for the training of the recognizer displayed on the display unit DS of the terminal apparatus 100. As illustrated in FIG. 12, when a person performs a click 120 on the concept information on the recognition target visualized information, the operation detection unit OP detects the operation information "display of image". In response that the operation information and the recognition target ID of the click target are output to the recognition training apparatus 10b, the terminal apparatus 100 obtains the moving image data from the recognition training apparatus 10b. The display unit DS displays a list 121 of the obtained moving image data.

Figure 13:
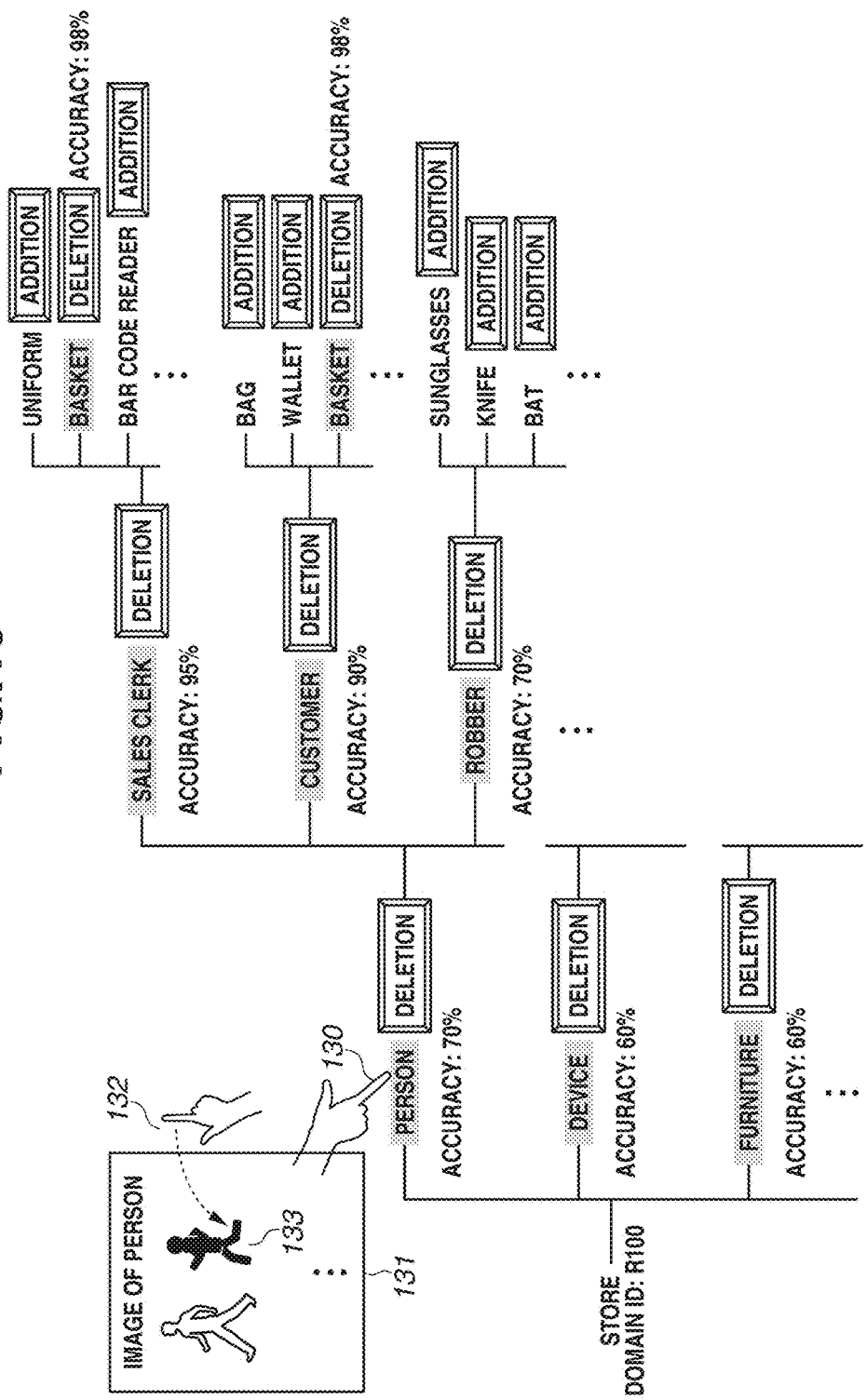
FIG. 13 illustrates an example of addition of moving image data by a terminal apparatus according to one or more aspects of the present disclosure.

FIG. 13 illustrates an example of addition of the moving image data of the terminal apparatus 100. First, as with FIG.

12, when a person performs a click 130 on the concept information on the recognition target visualized information, the display unit DS displays a list 131 of the obtained moving image data. Further, when the person performs a drag-and-drop 132 on moving image data 133 to be newly added to a list 131 of the moving image data, the operation detection unit OP detects the operation information "addition of image". The display unit DS displays the moving image data 133 in the list 131 as an addition destination. In addition, the terminal apparatus 100 outputs the added moving image data, the recognition target ID of the addition destination, and the recognition target name information to the recognition training apparatus 10b.

With reference to FIG. 11 again, the configuration of the recognition training apparatus 10b is described in detail below. The recognition training apparatus 10b is an apparatus for performing pre-training and fine-tuning on the recognizer with respect to the specific domain. The recognition training apparatus 10b includes the ontology storage unit M1, the moving image data storage unit M2, the recognizer storage unit M3, the semantic relevance generation unit 11, the recognition target selection unit 12, a recognition training unit 13b, the recognition target visualization unit 14, and the moving image data editing unit 16.

The moving image data editing unit 16 edits the moving image data used for training of the recognizer based on the operation information indicating an operation by a person with respect to the recognition target visualized information displayed on the display unit DS of the terminal apparatus 100. Specifically, in response that the operation information, the recognition target ID, and the recognition target name information are input from the terminal apparatus 100, the moving image data editing unit 16 performs processing based on a content of the operation information. When the operation information is "display of image", the moving image data editing unit 16 reads a line including the recognition target ID matching with the input recognition target ID from the moving image data storage unit M2. The moving image data editing unit 16 outputs the moving image data stored in the read line to the terminal apparatus 100. On the other hand, when the operation information is "addition of image", the moving image data editing unit 16 newly inputs the moving image data from the terminal apparatus 100. The moving image data editing unit 16 stores the input recognition target ID, the recognition target name information, the moving image data, and the data type information set to "training" in association with a newly assigned moving image data ID in the moving image data storage unit M2.

According to the present exemplary embodiment, the case is described in which the moving image data editing unit 16 adds the moving image data to the moving image data storage unit M2, and the moving image data editing unit 16 can similarly delete the moving image data from the moving image data storage unit M2. The addition operations of the moving image data in the recognition training system 1b are basically similar to the operations in the recognition training apparatus according to the first exemplary embodiment, so that the description thereof is omitted.

As described above, the moving image data editing unit of the recognition training apparatus can display the moving image data used in the pre-training and the fine-tuning of the recognizer for each concept information on the ontology information. Further, the moving image data editing unit can add the moving image data to each concept information and delete the already existing moving image data therefrom. Accordingly, the provider and the user of the recognizer can intuitively confirm variety of each recognition target that the recognizer can handle and adjust the variety of each recognition target by addition and deletion of data.

Next, a fourth exemplary embodiment for implementing the present disclosure is described with reference to the attached drawings. The configurations same as those according to the above-described first to third exemplary embodiments are denoted by the same reference numerals, and the descriptions thereof are omitted. A recognition training system 1c according to the present exemplary embodiment can be applied to a case in which a recognition target for pre-training is selected based on ontology information automatically generated from text data.

Figure 14:
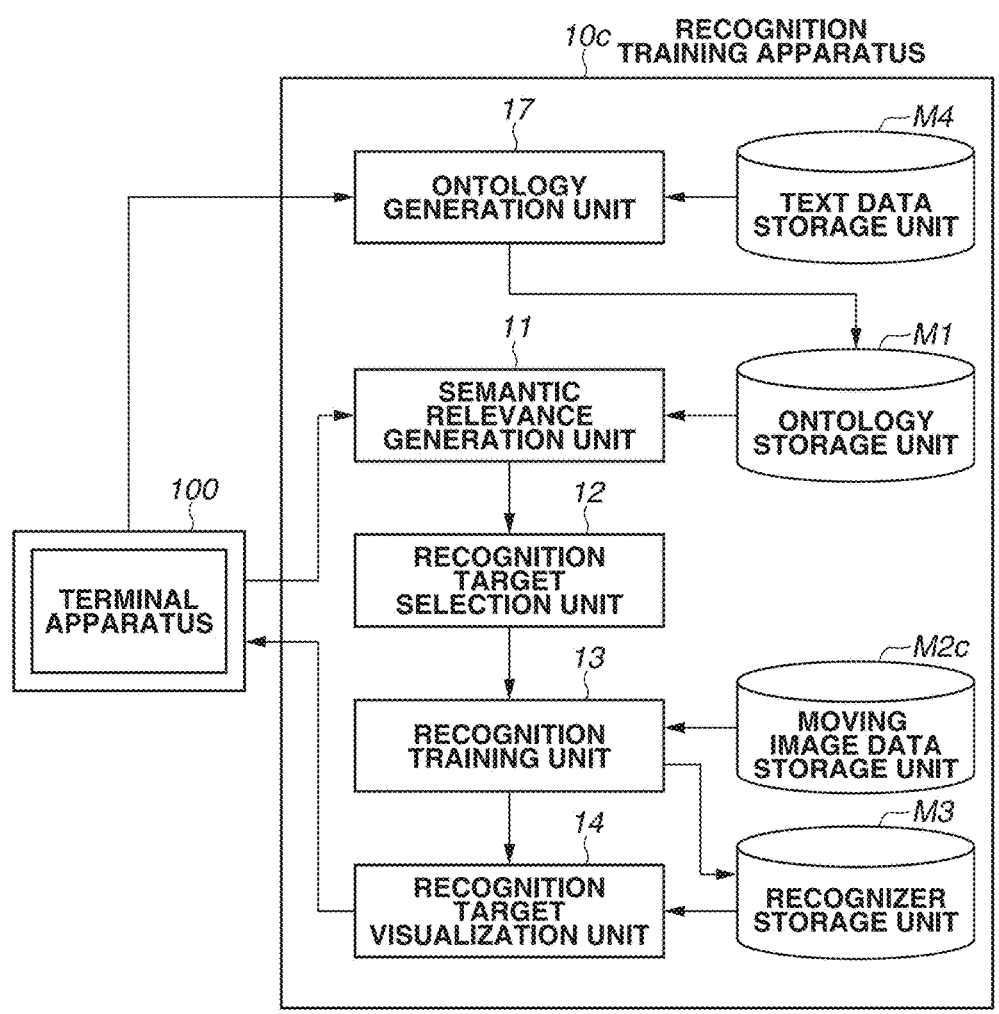
FIG. 14 is a schematic block diagram illustrating an example of a configuration of a recognition training system according to one or more aspects of the present disclosure.

FIG. 14 illustrates an example of a configuration of the recognition training system 1c according to the fourth exemplary embodiment of the present disclosure. The recognition training system 1c includes a recognition training apparatus 10c and the terminal apparatus 100.

The recognition training apparatus 10c is an apparatus for performing pre-training and fine-tuning on the recognizer with respect to the specific domain. The recognition training apparatus 10c includes the ontology storage unit M1, the moving image data storage unit M2, and the recognizer storage unit M3. The recognition training apparatus 10c further includes a text data storage unit M4, the semantic relevance generation unit 11, the recognition target selection unit 12, the recognition training unit 13, the recognition target visualization unit 14, and an ontology generation unit 17.

The text data storage unit M4 stores, although it is not illustrated, a text ID for identifying a text and text information expressing text data in a text format in association with the text ID therein. To the text data, for example, a dictionary database, such as Wikipedia and news released on the Internet can be applied.

According to the present exemplary embodiment, the case is described in which the text information stored in the text data storage unit M4 is the text data in the text format, however, the text information may be information expressing an address of text data stored in an external storage apparatus. To the external storage apparatus, for example, a web server and a storage server connected via the Internet can be applied. To the address, for example, an IP address and a URL can be applied. According to the present exemplary embodiment, the case is described in which the recognition training apparatus includes the text data storage unit M4, however, the text data storage unit M4 may be included in the external storage apparatus.

The display unit DS of the terminal apparatus 100 displays the list of the domain name information as with the first exemplary embodiment and also displays an "auto generation of ontology information" button. The operation detection unit OP detects a selection of the domain name information by a person and the operation information expressing pressing of the relevant button. The terminal apparatus 100 outputs the selected domain name information, the domain ID for identifying the domain name information, and the operation information "auto generation of ontology information" detected by the operation detection unit OP to the recognition training apparatus 10c.

Further, in response that the own apparatus outputs the domain name information, the domain ID, and the operation information "auto generation of ontology information" to the recognition training apparatus 10c, the terminal apparatus 100 is input the ontology information from the recognition training apparatus 10c. The display unit DS of the terminal apparatus 100 displays the tree structure visualizing the input ontology information.

The ontology generation unit 17 generates the ontology information regarding the specific domain from the text data stored in advance. Specifically, in response that the domain information, the domain ID, and the operation information "auto generation of ontology information" are input from the terminal apparatus 100, the ontology generation unit 17 reads the text information including the domain name information from the text data storage unit M4. The ontology generation unit 17 generates the ontology information from the read text information using a predetermined ontology information generation method. To the ontology information generation method, Japanese Wikipedia Ontology which is established by extracting the is-a relationship and the has-a relationship from Japanese Wikipedia and ontology in which Japanese Wikipedia and Japanese WordNet are integrated can be applied.

The ontology generation unit 17 stores the generated ontology information, the input domain ID, and the domain information in association with the domain ID in the ontology storage unit M1 and also outputs the generated ontology information to the terminal apparatus 100.

The ontology generation unit 17 may store ontology information of a fine-grained concept in advance and use the stored ontology information as a part of coarse-grained concept structure generated from the text information. For example, the concept structures 20 to 26 in a first hierarchy and a second hierarchy of the domain "store" illustrated in FIG. 2 may be automatically generated from the text information, and third and subsequent hierarchies may be generated using the ontology information pieces, i.e., "sales clerk", "customer", and "robber" stored in advance.

The ontology generation unit 17 may update the text information in the text data storage unit M4 at predetermined periods and update the ontology information stored in association with the domain ID in the ontology storage unit M1. The addition operations of the moving image data in the recognition training system 1b are basically similar to the operations in the recognition training apparatus according to the first exemplary embodiment, so that the description thereof is omitted.

As described above, the ontology generation unit 17 of the recognition training apparatus can automatically generate the ontology information from the text data. Accordingly, a load for the provider to develop the ontology information can be reduced. In addition, the ontology generation unit 17 can regularly update the ontology information, and accordingly the provider and the user of the recognizer can use the ontology information adaptable to a change in the concept structure due to changes in the times and birth and trend of a new technique.

Other Embodiments

According to each of the above-described exemplary embodiments, the case is described in which the ontology information includes the comprehensive concept information related to the specific domain, however, the ontology information may be developed for each of a specific use case and a specific user segment in the domain. For example, a specific use case in the domain "store" includes "for in front of a cash register", "for a merchandise shelf", "for robbery detection", "for shoplifting detection", "for customer segment analysis", and the like. Examples of a specific user segment in the domain "store" include "for sales clerk", "for store manager", "for supervisor", and the like. Upon selection of a specific use case or a specific user segment from a menu displayed on the terminal apparatus, corresponding ontology information may be automatically read.

Figure 15:
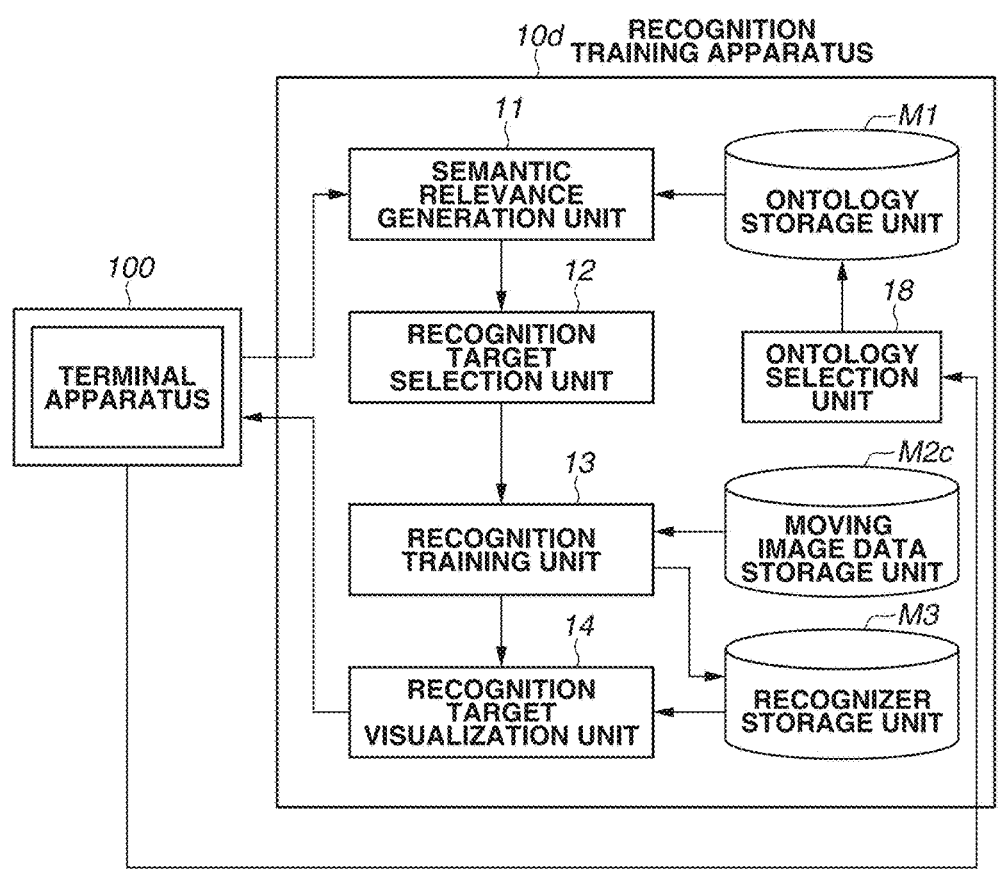
FIG. 15 is a schematic block diagram illustrating an example of a configuration of a recognition training system according to one or more aspects of the present disclosure.

FIG. 15 illustrates an example of a configuration of a recognition training system 1d according to an exemplary embodiment enabling selection of the ontology information. As illustrated in FIG. 15, the recognition training system 1d includes a recognition training apparatus 10d and the terminal apparatus 100. The recognition training apparatus 10d includes an ontology selection unit 18 in addition to the recognition training apparatus according to the first exemplary embodiment.

The terminal apparatus 100 displays a list of user segment information expressing the domain name information and a specific user segment stored in the own apparatus on the display unit DS. In response that the user selects the specific user segment information, the terminal apparatus 100 outputs the domain ID corresponding to the specific user segment information stored in the own apparatus to the recognition training apparatus 10d. In response that the domain ID is output to the recognition training apparatus 10d, the terminal apparatus 100 displays the ontology information obtained from the recognition training apparatus 10d on the display unit DS.

In response that the domain ID is input from the terminal apparatus 100, the ontology selection unit 18 reads the ontology information stored in association with the input domain ID from the ontology storage unit M1. The ontology selection unit 18 outputs the read ontology information to the terminal apparatus 100.

Figure 16:
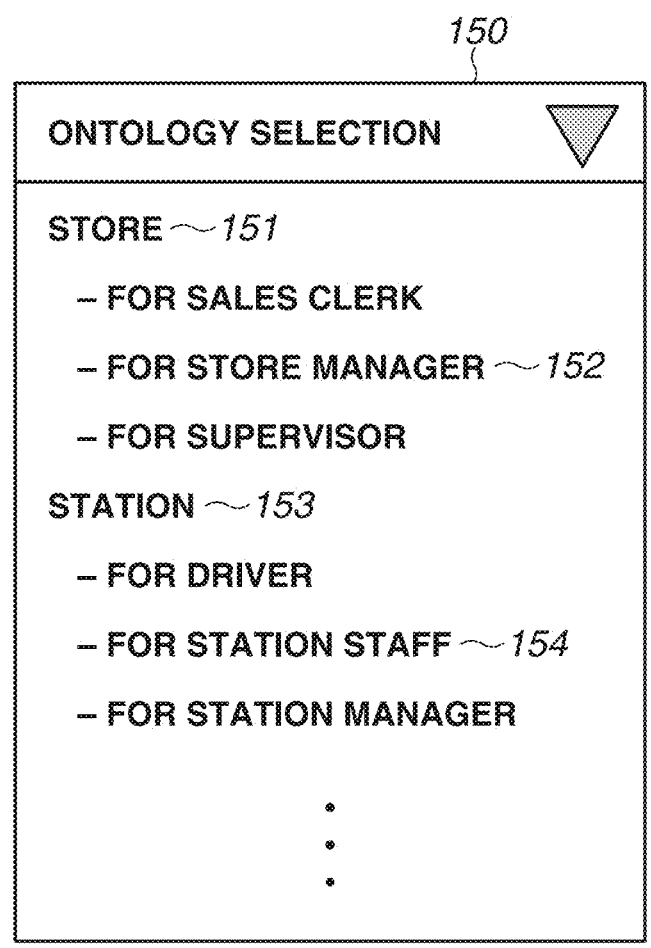
FIG. 16 illustrates an example of a selection menu of ontology information according to one or more aspects of the present disclosure the other exemplary embodiment.

FIG. 16 illustrates an example of a selection menu of the ontology information displayed on the display unit DS of the terminal apparatus 100. As illustrated in FIG. 16, when the user clicks an "ontology selection" button 150, the specific user segment information pieces, i.e., "for sales clerk", "for store manager", and "for supervisor" 152, related to the domain name information "store" 151 are displayed as a pull-down menu. Further, the specific user segment information pieces, i.e., "for driver", "for station staff", and "for station manager" 154 related to the domain name information "station" 153 are displayed as a pull-down menu.

According to each of the above-described exemplary embodiments, pre-training is performed on the recognition target related to a user needs by the domain, and thus shortening of a training time and avoidance of overfit can be expected in fine-tuning. Accordingly, user satisfaction can be improved. Further, the provider and the user of the recognizer use the common concept structure with respect to the specific domain and thus can share the application range and accuracy of the recognizer while considering comprehensiveness of the specific domain. Furthermore, the user can perform fine-tuning by intuitively selecting the recognition target according to his/her use case while considering the comprehensive recognition target related to the specific domain. Accordingly, the user satisfaction can be greatly improved.

Regarding the present disclosure, the specific configurations thereof are not limited to the above-described exemplary embodiments, and designs may be made without departing from the scope of the present disclosure. Each of the exemplary embodiments may be implemented by combining the above-described exemplary embodiments. Further, according to each of the above-described exemplary embodiments, the exemplary embodiment of the present disclosure are described using an issue for identifying a plurality of states as an example, however, the apparatus according to the present disclosure can be applied to an issue of general identification without departing from the scope of the present disclosure. For example, the apparatus according to the present disclosure can be applied to an issue of abnormality detection for discriminating normal or abnormal.

Further, according to the above-described exemplary embodiments, the cases are described in which the recognizer is trained with respect to the moving image data, however, the apparatus according to the present disclosure can be applied to general data without departing from the scope of the present disclosure. The apparatus according to the present disclosure can be applied to, for example, audio data, sensor data, and log data other than the moving image data. In addition, since the ontology information is generated from a language, and the recognizer for identifying the selected recognition target is trained based on the ontology information, the apparatus according to the present disclosure can be interpreted as using the language, a moving image, and multimodal information of the audio data, the sensor data, and the log data.

Further, according to each of the above-described exemplary embodiments, the case is described in which the user performs fine-tuning on the recognizer after subjected to pre-training according to an individual purpose, however, the apparatus according to the present disclosure can be applied to training of a general recognizer without departing from the scope of the present disclosure. For example, the recognition target may be selected by a person based on the ontology information at a stage of the pre-training. In addition, the recognizer may be updated by sequentially adding the moving image data.

Further, according to each of the above-described exemplary embodiments, the case in which the domain is a store is described as an example, however, the apparatus according to the present disclosure may be applied to an arbitrary domain other than the store. Other than the store, there are, for example, a nursing-care facility, an ordinary home, an intersection, a station, an airport, and a city.

Further, according to each of the above-described exemplary embodiments, the case of monitoring using a monitoring camera is described as an example, however, the apparatus according to the present disclosure can be applied to a purpose other than monitoring. The apparatus according to the present disclosure can be applied to, for example, statistics analysis in sports, scene recognition and aesthetic assessment of a general camera, and the like.

Further, according to each of the above-described exemplary embodiments, it is described that the recognition training apparatus includes the ontology storage unit M1, the moving image data storage unit M2, the recognizer storage unit M3, and the text data storage unit M4, however, these units may be disposed on a server via a network and another apparatus. Further, a program for realizing a function of each unit included in each apparatus may be stored in a computer-readable storage medium, and processing by each unit disposed on a server apparatus may be performed by a computer system reading and executing the program stored in the storage medium. The "computer system" described here includes hardware, such as an operation system (OS) and a peripheral device.

According to the above-described configuration, the present disclosure can perform training such as pre-training and fine-tuning of a recognizer in consideration of a user needs.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2016-005598, filed Jan. 14, 2016, which is hereby incorporated by reference herein in its entirety.

What is claimed is:

1. A recognition training apparatus comprising:
one or more processors; and
one or more memories storing instructions, when executed by the one or more processors, causing the recognition training apparatus to function as:
an ontology storage unit configured to store ontology information expressing a concept structure of a specific domain;
a moving image data storage unit configured to store moving image data information for identifying a recognition target;
a generation unit configured to generate relevance between the specific domain and a candidate of the recognition target based on the ontology information of the specific domain;
a selection unit configured to select the recognition target from the candidate of the recognition target based on the relevance generated by the generation unit; and
a training unit configured to train a recognizer using training data regarding the recognition target selected by the selection unit.

2. The recognition training apparatus according to claim 1, wherein the generation unit generates the relevance based on a hierarchy of the candidate of the recognition target in the ontology information.

3. The recognition training apparatus according to claim 2, wherein the generation unit further generates the relevance based on an occurrence frequency of the candidate of the recognition target in the ontology information.

4. The recognition training apparatus according to claim 1, wherein the generation unit generates the relevance based on a number of concept information pieces in a lower hierarchy than the candidate of the recognition target in the ontology information.

5. The recognition training apparatus according to claim 1 further comprising a visualization unit configured to generate visualized information in which the recognition target selected by the selection unit is superimposed on the ontology information.

6. The recognition training apparatus according to claim 5, wherein the visualization unit calculates recognition accuracy of the recognizer with respect to each recognition target selected by the selection unit and generates the calculated recognition accuracy as the visualized information.

7. The recognition training apparatus according to claim 5 further comprising:
an update unit configured to update the recognition target in response to a user operation with respect to the visualized information generated by the visualization unit,
wherein the training unit trains again the recognizer using the training data regarding the recognition target updated by the update unit.

8. The recognition training apparatus according to claim 5,
wherein the visualization unit generates moving image data of each recognition target as the visualized information, and
the recognition training apparatus further comprises an editing unit configured to perform addition or deletion to the training data regarding the recognition target in response to an instruction from a user with respect to the visualized information generated by the visualization unit.

9. The recognition training apparatus according to claim 1, wherein the training unit generates importance information expressing importance of the recognition target selected based on the relevance and performs training based on the generated importance information.

10. The recognition training apparatus according to claim 1 further comprising:
an ontology generation unit configured to generate the ontology information regarding the specific domain from text data,
wherein the generation unit generates the relevance between the specific domain and the candidate of the recognition target based on the ontology information generated by the ontology generation unit.

11. The recognition training apparatus according to claim 1 further comprising an ontology selection unit configured to select the ontology information developed to at least one of the specific domain, a specific user, and a specific use case in response to an input from a user.

12. A method for recognition training comprising:
referencing stored ontology information expressing a concept structure of a specific domain;
referencing stored moving image data information for identifying a recognition target;
generating relevance between the specific domain and a candidate of the recognition target based on ontology information expressing a concept structure of the specific domain;
selecting the recognition target from the candidate of the recognition target based on the generated relevance; and
training a recognizer using training data regarding the selected recognition target.

13. A non-transitory computer-readable recording medium that stores a program for causing a computer to function as units of a recognition training apparatus comprising:
one or more processors; and
one or more memories storing instructions, when executed by the one or more processors, causing the recognition training apparatus to function as:
an ontology storage unit configured to store ontology information expressing a concept structure of a specific domain;
a moving image data storage unit configured to store moving image data information for identifying a recognition target;
a generation unit configured to generate relevance between the specific domain and a candidate of the recognition target based on the ontology information of the specific domain;
a selection unit configured to select the recognition target from the candidate of the recognition target based on the relevance generated by the generation unit; and
a training unit configured to train a recognizer using training data regarding the recognition target selected by the selection unit.

* * * * *